United States Patent
Nanamiya et al.

(10) Patent No.: US 10,851,256 B2
(45) Date of Patent: Dec. 1, 2020

(54) INKJET PRINTING METHOD AND INKJET PRINTING APPARATUS

(71) Applicant: CANON KABUSHIKI KAISHA, Tokyo (JP)

(72) Inventors: Ryuki Nanamiya, Kawasaki (JP); Yukako Tamanuki, Tokyo (JP); Takashi Saito, Kawasaki (JP); Hiroshi Kakikawa, Fujisawa (JP); Kazuya Nushiro, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 15/828,051

(22) Filed: Nov. 30, 2017

(65) Prior Publication Data

US 2018/0163068 A1  Jun. 14, 2018

(30) Foreign Application Priority Data

Dec. 14, 2016 (JP) .................................. 2016-242649
Sep. 19, 2017 (JP) .................................. 2017-178958

(51) Int. Cl.
| | | |
|---|---|---|
| C09D 11/00 | (2014.01) | |
| C09D 11/40 | (2014.01) | |
| C09D 11/322 | (2014.01) | |
| C09D 11/326 | (2014.01) | |
| C09K 3/00 | (2006.01) | |
| C09D 1/00 | (2006.01) | |
| C09D 4/00 | (2006.01) | |
| C09D 5/00 | (2006.01) | |
| B41J 2/21 | (2006.01) | |

(52) U.S. Cl.
CPC ............ *C09D 11/40* (2013.01); *C09D 11/322* (2013.01); *C09D 11/326* (2013.01); *B41J 2/21* (2013.01)

(58) Field of Classification Search
USPC ...................... 106/31.01, 31.13, 31.27, 31.43
See application file for complete search history.

(56) References Cited

U.S. PATENT DOCUMENTS

| | | | |
|---|---|---|---|
| 9,944,084 B2 * | 4/2018 | Yamashita | ............... B41J 2/175 |
| 2014/0063157 A1 * | 3/2014 | Ikegami | ............... C09D 11/328 347/100 |
| 2018/0163068 A1 * | 6/2018 | Nanamiya | .............. C09D 11/40 |

FOREIGN PATENT DOCUMENTS

| | | | |
|---|---|---|---|
| JP | H0195093 A | | 4/1989 |
| JP | 2000273374 A | | 10/2000 |
| JP | 2004323605 A | | 11/2004 |
| JP | 2006143989 A | | 6/2006 |
| JP | 2006299127 A | | 11/2006 |
| JP | 2011148973 A | | 8/2011 |
| JP | 2012193311 A | * | 10/2012 |
| JP | 2013035922 A | * | 2/2013 |
| JP | 2013256548 A | | 12/2013 |
| JP | 2014080552 A | * | 5/2014 |
| JP | 2015007178 A | | 1/2015 |
| JP | 2016108545 A | | 6/2016 |
| WO | 2008066062 A | | 6/2008 |

* cited by examiner

*Primary Examiner* — James E McDonough
(74) *Attorney, Agent, or Firm* — Canon U.S.A., Inc. IP Division

(57) ABSTRACT

An inkjet printing method for printing an image by using a cyan ink, a magenta ink, and a blue ink, including the step of applying the blue ink to a region provided with both the cyan ink and the magenta ink.

5 Claims, 1 Drawing Sheet

INKJET PRINTING METHOD AND INKJET PRINTING APPARATUS

BACKGROUND

Field of the Disclosure

The present disclosure relates to an inkjet printing method and an inkjet printing apparatus.

Description of the Related Art

In general, a blue color is expressed by applying a magenta ink and a cyan ink to a printing medium so as to overlay one ink on another. The blue color is frequently used for reproducing a blue sky, an inside of water, and the like as an image. When ink containing a dye serving as a color material is used, it is required that the color developability of the resulting image and the weatherability, e.g., the moisture resistance and the ozone resistance, are improved than ever before. A method for printing an image on a printing medium has been investigated, where a cyan ink containing a color material composed of a compound having a phthalocyanine skeleton and a magenta ink containing a color material composed of a compound having an azo skeleton are used (refer to Japanese Patent Laid-Open No. 1-95093). In order to improve the color developability of an image, a compound having a xanthene skeleton has been investigated as a color material in the magenta ink (refer to Japanese Patent Laid-Open No. 2011-148973). Further, an ink set composed of a cyan ink, magenta ink, and a blue ink has been investigated (refer to Japanese Patent Laid-Open No. 2000-273374). According to Japanese Patent Laid-Open No. 2000-273374, the cyan ink contains a color material composed of a compound having a phthalocyanine skeleton, the magenta ink contains a color material composed of a compound having a xanthene skeleton, and the blue ink contains a color material and a water-soluble organic solvent.

It was found that when an image is printed by using the cyan ink described in Japanese Patent Laid-Open No. 1-95093, the ozone resistance of the image was improved. However, when an image is printed by using the magenta ink described in Japanese Patent Laid-Open No. 1-95093, the color developability of the image and the weatherability, e.g., the moisture resistance and the ozone resistance, were insufficient. Then, when an image was printed by using the magenta ink which was described in Japanese Patent Laid-Open No. 2011-148973 and which contained a compound having a xanthene skeleton, the color developability was improved. However, it was found that the weatherability of the image reached some extent of level but there was room for further improvement.

In addition, when the cyan ink which was described in Japanese Patent Laid-Open No. 1-95093 and the magenta ink which was described in Japanese Patent Laid-Open No. 2011-148973 and which contained a compound having a xanthene skeleton were applied to a printing medium so as to be overlaid with each other for the purpose of expressing the blue color, it was found that color unevenness of the image resulted. It was also found that the bronze resistance of the image was not obtained. In Japanese Patent Laid-Open No. 2000-273374, it is not indicated that three types of inks, i.e., the cyan ink, the magenta ink, and the blue ink are applied so as to be overlaid with each other for the purpose of expressing the blue color.

SUMMARY

Accordingly, the present disclosure provides an inkjet printing method capable of printing an image having excellent weatherability, color developability, and bronze resistance and suppressing color unevenness of the image when a blue color is expressed by using a cyan ink and a magenta ink. In addition, the present disclosure provides an inkjet printing apparatus in which the inkjet printing method is used.

The present disclosure provides an inkjet printing method for printing an image on a printing medium by ejecting each of a cyan ink, a magenta ink, and a blue ink from a printing head, including the step of applying the blue ink to a region provided with both the cyan ink and the magenta ink, wherein a color material for the cyan ink contains a compound having a phthalocyanine skeleton, a color material for the magenta ink contains a compound denoted by general formula (1) described below, the blue ink contains a color material and a water-soluble organic solvent, the water-soluble organic solvent contains a first water-soluble organic solvent having a Log P value of −1.10 or more, the content (percent by mass) of the first water-soluble organic solvent is 1.0 times or more to 16.5 times or less the content (percent by mass) of the compound denoted by general formula (1) in the magenta ink on a mass ratio basis, and the hue angle of the blue ink is between the hue angle of the cyan ink and the hue angle of the magenta ink, general formula (1)

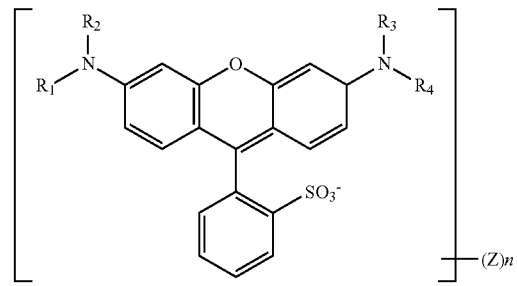

(in general formula (1), each of $R_1$, $R_2$, $R_3$, and $R_4$ represents a hydrogen atom, an alkyl group, or an aryl group, each Z represents a sulfonic acid group or a sulfamoyl group, n represents an integer of 0 or more to 3 or less, and Z is a substituent at the position of at least one of hydrogen atoms of aromatic rings in general formula (1) when Z is present).

In addition, the present disclosure provides an inkjet printing apparatus that prints an image by ejecting, from a printing head, inks stored in an ink storage portion, wherein the inks are the cyan ink, the magenta ink, and the blue ink.

According to the present disclosure, an inkjet printing method and an inkjet printing apparatus are provided, where an image having excellent weatherability, e.g., moisture resistance and ozone resistance, color developability, and bronze resistance is printed and color unevenness of the image is suppressed when a blue color is expressed by using a cyan ink and a magenta ink.

Further features of the present disclosure will become apparent from the following description of exemplary embodiments with reference to the attached drawings.

DESCRIPTION OF THE EMBODIMENTS

Figure 1A:
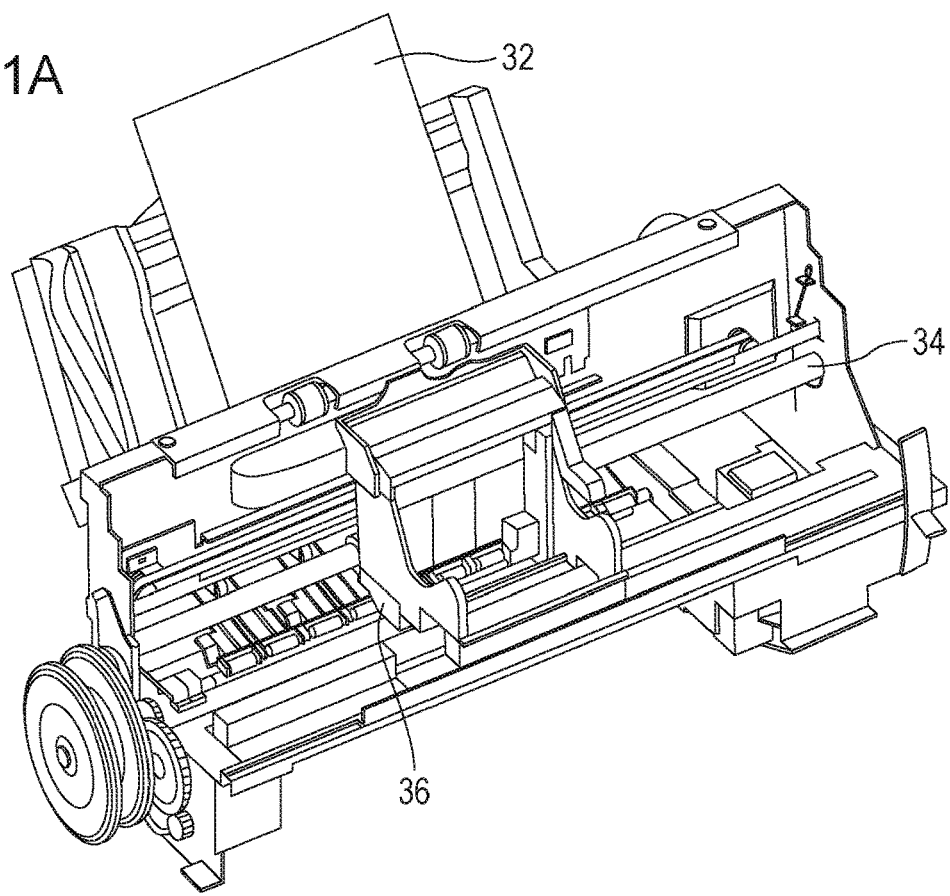
FIG. 1A is a schematic diagrams showing a perspective view of a key portion of the inkjet printing apparatus used for an inkjet printing method according to the present disclosure.

The present disclosure will be described below in further detail with reference to the embodiments. In the present disclosure, when a compound is a salt, at least part of the salt may dissociate into an ion in an aqueous liquid, e.g., water and ink, but the compound is expressed as a "salt" for the sake of convenience. A letter "n" prefixed to an alkyl group expresses a straight chain. The compound denoted by general formula (1) may be referred to as a "compound of general formula (1)", and the compound denoted by general formula (2) may be referred to as a "compound of general formula (2)". The physical property values are values at a temperature of 25° C. unless otherwise specified.

Examples of a color material for a cyan ink include compounds having a triphenylmethane skeleton and compounds having a phthalocyanine skeleton. In particular, the ozone resistance of the image printed may be improved by selecting a compound having a phthalocyanine skeleton.

Examples of a color material for a magenta ink include compounds having an azo skeleton, compounds having an anthrapyridone skeleton, and compounds having a xanthene skeleton. In particular, the color developability of an image printed is improved when a compound having a xanthene skeleton is included. Further, the image printed with the magenta ink containing the compound of general formula (1) having a xanthene skeleton has improved ozone resistance compared with that when an ink containing a compound having an azo skeleton with a small molecular weight or a compound having an anthrapyridone skeleton is used.

However, the color material for the cyan ink is a compound having a phthalocyanine skeleton and, therefore, aggregation easily occurs because of interaction of the phthalocyanine skeleton. If the cyan ink and the magenta ink are applied to a printing medium so as to be overlaid with each other, the hue of a secondary color differs in accordance with the order of application of the inks, as described below, and color unevenness of an image results.

When the magenta ink is applied to the printing medium and, thereafter, the cyan ink is applied over the magenta ink, the color material for the cyan ink that easily aggregates tends to be present at a location nearer to the surface of the printing medium and the color material for the magenta ink tends to be present at a location farther from the surface of the printing medium. However, if the cyan ink is applied to the printing medium and, thereafter, the magenta ink is applied over the cyan ink, the color material for the cyan ink that easily aggregates is present at a location nearer to the surface of the printing medium. Consequently, the color material for the magenta ink does not easily move to a location far from the surface of the printing medium. In particular, the compound of general formula (1) having a structure with an enhanced aggregation property may be present at a location nearer to the surface of the printing medium. As described above, the locations at which the color material for the magenta ink and the color material for the cyan ink are present on the printing medium are changed in accordance with the order of application of the magenta ink and the cyan ink. As a result, color unevenness of the image occurs because the hue of a secondary color composed of the cyan ink and the magenta ink is thereby changed.

In order to suppress color unevenness of the image, the present inventors found a method for fixing, as much as possible, the locations at which the color material for the cyan ink and the color material for the magenta ink were present on the printing medium even when the order of application of the cyan ink and the magenta ink to the printing medium was changed. A first water-soluble organic solvent having a Log P value of −1.10 or more does not easily dissolve the compound of general formula (1) having a phthalocyanine skeleton, but easily dissolves the compound of general formula (1) having a xanthene skeleton. Consequently, even when the order of application of the inks to the printing medium is changed, the color material for the magenta ink tends to be present at a location far from the surface of the printing medium, and the color material for the cyan ink tends to be present at a location nearer to the surface of the printing medium. As a result, it is possible to fix the locations at which the color materials are present on the printing medium.

However, if the cyan ink contains the first water-soluble organic solvent, the compound having the phthalocyanine skeleton easily aggregates and, thereby, reliability, e.g., storage stability and sticking tendency, of the ink is not obtained easily. If the magenta ink contains the first water-soluble organic solvent, the compound of general formula (1) having the xanthene skeleton is easily dissolved and, thereby, the compound of general formula (1) in addition to a liquid component in the ink permeate the printing medium. Consequently, the optical density of the image is not easily obtained.

Then, a blue ink containing the first water-soluble organic solvent is applied to the region provided with both the cyan ink and the magenta ink. The hue angle of the blue ink is between the hue angle of the cyan ink and the hue angle of the magenta ink. When the above-described blue ink is used, the locations, at which the color material for the cyan ink and the color material for the magenta ink are present on the printing medium, are fixed while maintaining the hue of blue that is the secondary color composed of the cyan ink and the magenta ink. Consequently, color unevenness of the image is suppressed.

The content (percent by mass) of the first water-soluble organic solvent has to be 1.0 times or more to 16.5 times or less the content (percent by mass) of the compound of general formula (1) in the magenta ink on a mass ratio basis. If the mass ratio is less than 1.0 times, the amount of the first water-soluble organic solvent is excessively small relative to the amount of the compound of general formula (1), and the compound of general formula (1) is not easily dissolved. Consequently, when the magenta ink is applied after the cyan ink is applied, the color material for the magenta ink does not easily move to a location far from the surface of the printing medium. The locations at which the color material for the magenta ink and the color material for the cyan ink are present on the printing medium are changed and, therefore, color unevenness of the image is not suppressed. If the mass ratio is more than 16.5 times, the amount of the first water-soluble organic solvent is excessively large relative to the amount of the compound of general formula (1), and the compound of general formula (1) is easily dissolved. Consequently, the compound of general formula (1) and a liquid component in the ink easily permeate the printing medium and, thereby, the amount of the compound of general formula (1) present near to the surface of the printing medium decreases. When the amount of the compound of general formula (1) present near to the surface of the printing medium decreases, the amount of reflected light from the compound of general formula (1) decreases. If bronze light is present in the reflected light, the bronze light is conspicuous because the amount of the reflected light decreases. As a result, the bronze resistance of the image is not obtained.

Inkjet Printing Method

In the inkjet printing method according to the present disclosure, each of the cyan ink, the magenta ink, and the blue ink is ejected from a printing head so as to print an image onto the printing medium. In addition, the step of further applying the blue ink to a region provided with both the cyan ink and the magenta ink is included.

Examples of systems for ejecting the ink include a system in which mechanical energy is applied to the ink and a system in which thermal energy is applied to the ink. In the present disclosure, in particular, the system in which the ink is ejected by applying thermal energy to the ink can be adopted. The inkjet printing method may be composed of the known steps except that the cyan ink, the magenta ink, and the blue ink are applied in a predetermined order.

Figure 1B:
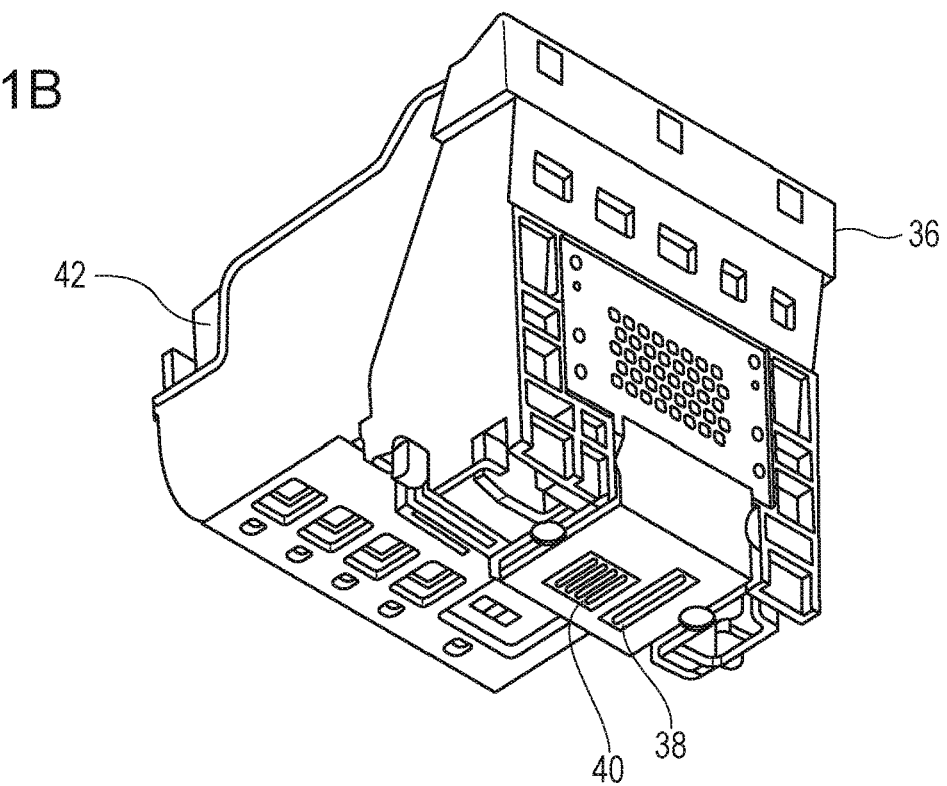
FIG. 1B is a schematic diagrams showing a perspective view of a head cartridge used for an inkjet printing method according to the present disclosure.

FIGS. 1A and 1B are schematic diagrams showing an example of an inkjet printing apparatus used for the inkjet printing method according to the present disclosure, FIG. 1A is a perspective view of a key portion of the inkjet printing apparatus, and FIG. 1B is a perspective view of a head cartridge. The inkjet printing apparatus includes a conveying means (not shown in the drawing) so as to convey a printing medium 32 and a carriage shaft 34. A head cartridge 36 may be mounted on the carriage shaft 34. The head cartridge 36 is provided with printing heads 38 and 40 and is configured to be incorporated with an ink cartridge 42. The ink (not shown in the drawing) is ejected from the printing heads 38 and 40 toward the printing medium 32 while the head cartridge 36 is conveyed along the carriage shaft 34 in the main scanning direction. Further, the printing medium 32 is conveyed in the sub-scanning direction by the conveying means (not shown in the drawing) and, as a result, an image is printed on the printing medium 32.

Ink

In the inkjet printing method according to the present disclosure, the cyan ink, the magenta ink, and the blue ink are used. The cyan ink, the magenta ink, and the blue ink will be described below in detail.

Color Material for Cyan Ink

The color material for the cyan ink used in the inkjet printing method according to the present disclosure includes the compound having the phthalocyanine skeleton. The content (percent by mass) of the compound having a phthalocyanine skeleton is preferably 0.2 percent by mass or more to 8.0 percent by mass or less with reference to the total mass of the cyan ink. The content is more preferably 0.5 percent by mass or more to 7.0 percent by mass or less, and further preferably 1.0 percent by mass or more to 6.0 percent by mass or less.

Compound Having Phthalocyanine Skeleton

Examples of compounds having a phthalocyanine skeleton include the following compounds. In the present disclosure, it is important to use a color material composed of the compound having a phthalocyanine skeleton. Therefore, the color material is not limited to the following compounds as long as such a requirement is satisfied. In the present disclosure, a compound having a phthalocyanine skeleton in which the center element is copper can be used from the viewpoint of the ozone resistance of the image. At least one of outermost shell aromatic rings of the phthalocyanine skeleton can be a heterocycle and, in particular, a nitrogen-containing aromatic ring (for example, a pyridine ring or a pyrazine ring). The compound having such a structure can particularly be used because the color developability, the light fastness, and the gas resistance of the resulting image are improved in balance.

C.I. Direct blue: 6, 22, 25, 71, 78, 86, 87, 90, 106, 189, 199, 262, 264, 276, 282, 314, and the like C.I. Acid blue: 9, 22, 40, 59, 93, 102, 104, 113, 117, 120, 167, 185, 197, 224, 228, 229, 234, 242, 243, 249, 254, 275, 279, 283, 310, 357, and the like Compounds denoted by general formula (4) described below (compounds described in Japanese Patent Laid-Open No. 2004-323605)

general formula (4)

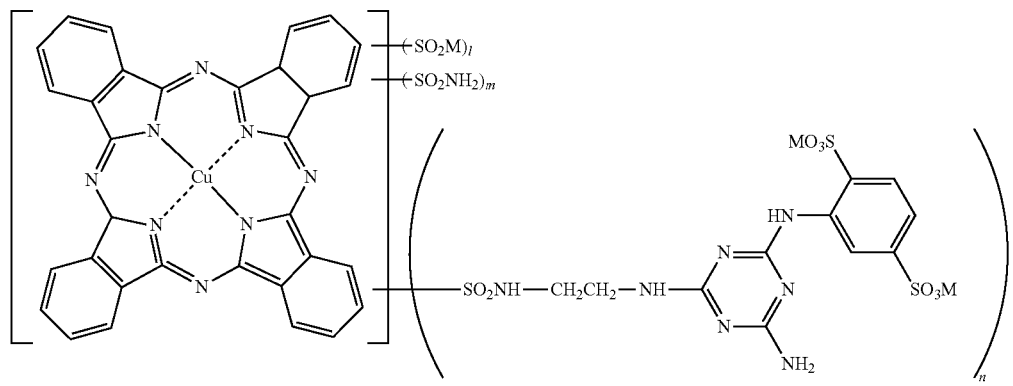

(in general formula (4), M represents an alkali metal or ammonium, l represents 0 or more to 2 or less, m represents 1 or more to 3 or less, n represents 1 or more to 3 or less, the total of l, m, and n is 2 or more to 4 or less, and a constituent is introduced in at least one benzene ring constituting a phthalocyanine ring)

Compounds denoted by general formula (5) described below (compounds described in Japanese Patent Laid-Open No. 2013-256548)

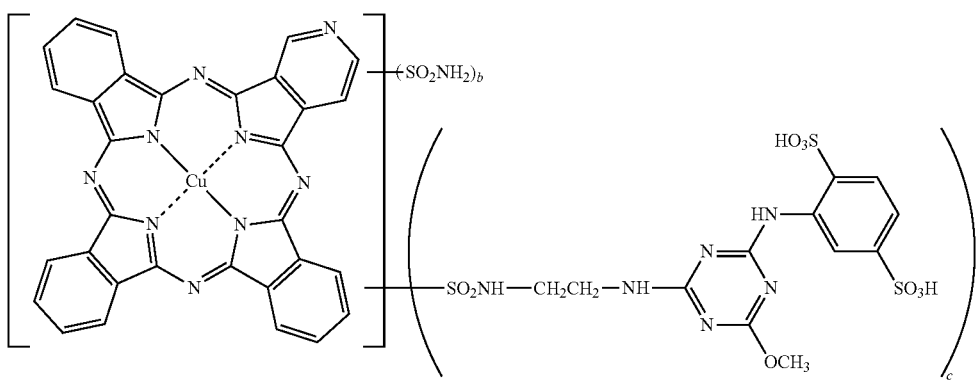

general formula (5)

(in general formula (5), the average value of b is more than 0.0 to less than 3.9, the average value of c is 0.1 or more to less than 4.0, and the average value of the total value of b and c is 1.0 or more to less than 4.0)

Color Material for Magenta Ink

The magenta ink used for the inkjet printing method according to the present disclosure contains a compound denoted by general formula (1). The content (percent by mass) of the color material composed of the compound of general formula (1) is preferably 0.2 percent by mass or more to 8.0 percent by mass or less with reference to the total mass of the magenta ink. The content is more preferably 0.5 percent by mass or more to 6.0 percent by mass or less, and further preferably 1.0 percent by mass or more to 3.0 percent by mass or less.

Compound Denoted by General Formula (1)

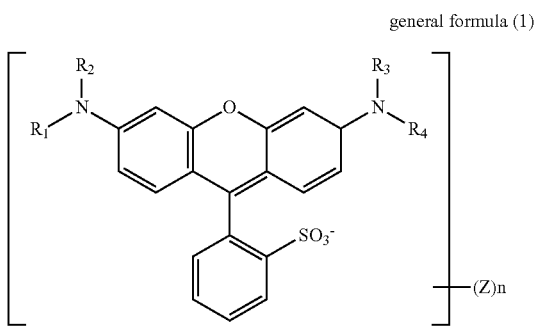

general formula (1)

(in general formula (1), each of $R_1$, $R_2$, $R_3$, and $R_4$ represents a hydrogen atom, an alkyl group, or an aryl group, each Z represents a sulfonic acid group or a sulfamoyl group, n represents an integer of 0 or more to 3 or less, and Z is a substituent at the position of at least one of hydrogen atoms of aromatic rings in general formula (1) when Z is present)

Each of $R_1$, $R_2$, $R_3$, and $R_4$ represents a hydrogen atom, an alkyl group, or an aryl group. At least one of $R_1$, $R_2$, $R_3$, and $R_4$ can be an alkyl group or an aryl group from the viewpoint of color developability and weatherability, e.g., moisture resistance and ozone resistance.

Examples of the alkyl group of each of $R_1$, $R_2$, $R_3$, and $R_4$ can be a straight chain or branched chain alkyl group having a carbon number of 1 or more to 6 or less, and preferably having a carbon number of 1 or more to 3 or less. The alkyl group of each of $R_1$, $R_2$, $R_3$, and $R_4$ may have a substituent within the bounds of not impairing the ozone resistance, the moisture resistance, and the color developability of the compound denoted by general formula (1). Examples of such a substituent include an acylamino group; a hydroxy group; alkoxy groups having a carbon number of 1 or more to 3 or less, e.g., a methoxy group, an ethoxy group, and a propoxy group; a cyano group; and halogen atoms, e.g., a fluorine atom, a chlorine atom, and a bromine atom.

Examples of the alkyl group of each of $R_1$, $R_2$, $R_3$, and $R_4$ include unsubstituted alkyl groups, e.g., a methyl group, an ethyl group, an n-propyl group, an isopropyl group, an n-butyl group, an isobutyl group, a sec-butyl group, a tert-butyl group, a 1-methylbutyl group, an n-pentyl group, and an n-hexyl group; and substituted alkyl groups, e.g., a 2-hydroxyethyl group, a 2-methoxyethyl group, a 2-cyanoethyl group, and a trifluoromethyl group, when alkyl groups having a substituent are included. The carbon number of the alkyl group is preferably 1 or more to 3 or less, and the alkyl group can be a methyl group, an ethyl group, an n-propyl group, or an isopropyl group from the viewpoint of ease of synthesis.

Examples of the aryl group of each of $R_1$, $R_2$, $R_3$, and $R_4$ can be an aryl group having a carbon number of 6 or more to 36 or less, and preferably having a carbon number of 8 or more to 32 or less. The aryl group of each of $R_1$, $R_2$, $R_3$, and $R_4$ may have a substituent within the bounds of not impairing the ozone resistance, the moisture resistance, and the color developability of the compound denoted by general formula (1). Examples of such a substituent include an acylamino group; a hydroxy group; alkoxy groups having a carbon number of 1 or more to 3 or less, e.g., a methoxy group, an ethoxy group, and a propoxy group; a cyano group; and halogen atoms, e.g., a fluorine atom, a chlorine atom, and a bromine atom.

Examples of the aryl group of each of $R_1$, $R_2$, $R_3$, and $R_4$ include a phenyl group, a p-tolyl group, a p-methoxyphenyl group, an o-chlorophenyl group, and a m-(3-sulfopropylamino)phenyl group.

When the carbon number of the alkyl group or the aryl group of each of $R_1$, $R_2$, $R_3$, and $R_4$ increases, the ozone resistance of the image is improved. However, if the carbon number of the alkyl group increases, the hydrophobicity of the compound of general formula (1) is enhanced and, thereby, the compound of general formula (1) easily aggregates. Therefore, when the blue ink does not contain the first water-soluble organic solvent, the compound of general formula (1) having high aggregation property tends to be present at a location nearer to the surface of the printing medium. Consequently, the locations at which the color material for the magenta ink and the color material for the cyan ink are present on the printing medium are changed in accordance with the order of application of the inks. As a result, color unevenness of the image tends to occur.

Examples of the compound denoted by general formula (1) include C.I. Acid red 52, C.I. Acid red 289, and a compound denoted by general formula (2) described below. In particular, the color material for the magenta ink can contain the compound denoted by general formula (2) from the viewpoint of the color developability and the weatherability, e.g., the moisture resistance and the ozone resistance, of the image.

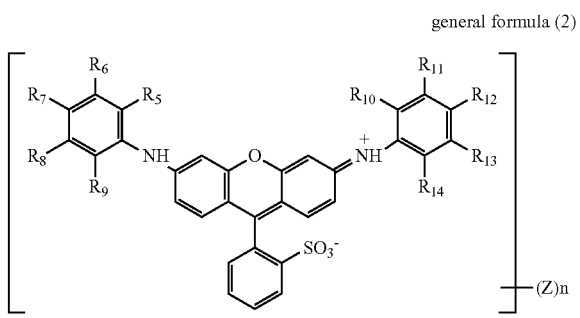

general formula (2)

(in general formula (2), each of $R_5$, $R_9$, $R_{10}$, and $R_{14}$ represents an alkyl group, each of $R_7$ and $R_{12}$ represents a hydrogen atom, an alkyl group, an alkoxy group, an aryloxy group, or an ionic group, each of $R_6$, $R_8$, $R_{11}$, and $R_{13}$ represents a hydrogen atom, an ionic group, or a group denoted by general formula (3) described below, each Z represents a sulfonic acid group or a sulfamoyl group, n represents an integer of 0 or more to 3 or less when at least one of $R_6$, $R_7$, $R_8$, $R_{11}$, $R_{12}$, and $R_{13}$ has an ionic group, n represents an integer of 1 or more to 3 or less when $R_6$, $R_7$, $R_8$, $R_{11}$, $R_{12}$, and $R_{13}$ do not have an ionic group, and Z is a substituent at the position of at least one of hydrogen atoms of aromatic rings in general formula (2) when Z is present)

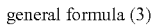

general formula (3)

(in general formula (3), $R_{15}$ represents an alkyl group, a cycloalkyl group, an aryl group, an arylalkyl group, an alkenyl group, or a hetero ring group)

In general formula (2), each of $R_5$, $R_9$, $R_{10}$, and $R_{14}$ represents an alkyl group. Examples of the alkyl group of each of $R_5$, $R_9$, $R_{10}$, and $R_{14}$ can be a straight chain or branched chain alkyl group having a carbon number of 1 or more to 6 or less, and preferably having a carbon number of 1 or more to 3 or less. The alkyl group of each of $R_5$, $R_9$, $R_{10}$, and $R_{14}$ may have a substituent within the bounds of not impairing the moisture resistance, the sticking recovery property, and the intermittent ejection stability of the compound denoted by general formula (2). Examples of such a substituent include a hydroxy group; alkoxy groups having a carbon number of 1 or more to 3 or less, e.g., a methoxy group, an ethoxy group, and a propoxy group; a cyano group; and halogen atoms, e.g., a fluorine atom, a chlorine atom, and a bromine atom. Examples of the alkyl group of each of $R_5$, $R_9$, $R_{10}$, and $R_{14}$ include unsubstituted alkyl groups, e.g., a methyl group, an ethyl group, an n-propyl group, an isopropyl group, an n-butyl group, an isobutyl group, a sec-butyl group, a tert-butyl group, a 1-methylbutyl group, an n-pentyl group, and an n-hexyl group; and substituted alkyl groups, e.g., a 2-hydroxyethyl group, a 2-methoxyethyl group, a 2-cyanoethyl group, and a trifluoromethyl group, when alkyl groups having a substituent are included. The carbon number of the alkyl group is preferably 1 or more to 6 or less because more excellent moisture resistance is obtained. The carbon number of the alkyl group is more preferably 1 or more to 3 or less from the viewpoint of ease of synthesis, and the alkyl group can be a methyl group, an ethyl group, an n-propyl group, or an isopropyl group.

In general formula (2), each of $R_7$ and $R_{12}$ represents a hydrogen atom, an alkyl group, an alkoxy group, an aryloxy group, or an ionic group. The alkyl group, the alkoxy group, and the aryloxy group of each of $R_7$ and $R_{12}$ may have a substituent within the bounds of not impairing the moisture resistance, the sticking recovery property, and the intermittent ejection stability of the compound denoted by general formula (2). Examples of such a substituent include alkyl groups having a carbon number of 1 or more to 3 or less, e.g., a methyl group, an ethyl group, and an isopropyl group; aryl groups having a carbon number of 6 or more to 12 or less, e.g., a phenyl group and a naphthyl group; aralkyl groups having a carbon number of 7 or more to 14 or less, e.g., a benzyl group, an n-propyl group, a p-tolyl group, a m-xylyl group, a 2-phenethyl group, and a naphthylethyl group; a hydroxy group; a carbamoyl group; a sulfamoyl group; alkoxy groups having a carbon number of 1 or more to 3 or less, e.g., a methoxy group, an ethoxy group, an n-propoxy group, and an isopropoxy group; a cyano group; and halogen atoms, e.g., a fluorine atom, a chlorine atom, and a bromine atom; and ionic groups, e.g., a carboxylic acid group, a sulfonic acid group, a phosphoric acid group, and a phosphonic acid group.

Examples of the alkyl group of each of $R_7$ and $R_{12}$ include straight chain or branched chain alkyl groups having a carbon number of 1 or more to 6 or less, and preferably having a carbon number of 1 or more to 3 or less. Examples of the alkyl group of each of $R_7$ and $R_{12}$ include unsubstituted alkyl groups, e.g., a methyl group, an ethyl group, an n-propyl group, an isopropyl group, an n-butyl group, an isobutyl group, a sec-butyl group, a tert-butyl group, a 1-methylbutyl group, an n-pentyl group, and an n-hexyl group; and substituted alkyl groups, e.g., a 2-hydroxyethyl group, a 2-methoxyethyl group, a 2-cyanoethyl group, a trifluoromethyl group, a 3-sulfopropyl group, a 4-sulfobutyl group, and a 4-carboxybutyl group, when alkyl groups having a substituent are included. The carbon number of the alkyl group is preferably 1 or more to 3 or less when the ionic group that is a substituent is not present and is preferably 4 or more to 6 or less when the ionic group that is a substituent is present because more excellent moisture resistance is obtained and the solubility into the water is enhanced.

Examples of the alkoxy group of each of $R_7$ and $R_{12}$ include straight chain or branched chain alkoxy groups having a carbon number of 1 or more to 6 or less, and preferably having a carbon number of 1 or more to 3 or less. Examples of the alkoxy group of each of $R_7$ and $R_2$ include unsubstituted alkoxy groups, e.g., a methoxy group, an ethoxy group, an n-propoxy group, and an isopropoxy group; and substituted alkoxy groups, e.g., a 2-methoxyethoxy group, a 2-hydroxyethoxy group, and a 3-carboxypropoxy group when alkoxy groups having a substituent are included. The carbon number of the alkoxy group is preferably 1 or more to 6 or less because more excellent moisture resistance is obtained. Further, the carbon number of the alkoxy group is particularly preferably 1 or more to 3 or less because more excellent moisture resistance is obtained and the solubility into the water is enhanced.

Examples of the aryloxy group of each of $R_7$ and $R_{12}$ include aryloxy groups having a carbon number of 6 or more to 18 or less, preferably having a carbon number of 6 or more to 12 or less, and particularly preferably having a carbon number of 6 or more to 10 or less. Examples of the aryloxy group of each of $R_7$ and $R_{12}$ include unsubstituted aryloxy groups, e.g., a phenoxy group, a 2-naphthoxy group, a 1-anthryloxy group, a 9-phenanthryloxy group, and a 1-azulenyloxy group; and substituted aryloxy groups, e.g., a p-methoxyphenoxy group, an o-methoxyphenoxy group, an o-tolyloxy group, a p-tolyloxy group, a 2,3-xylyloxy group, a 3,5-xylyloxy group, a 4-carboxy-2-methylphenoxy group, and a 4-sulfo-2-methylphenoxy group when aryloxy groups having a substituent are included. The carbon number of the aryloxy group is preferably 6 or more to 18 or less, further preferably 6 or more to 12 or less, and particularly preferably 6 or more to 10 or less because more excellent moisture resistance is obtained. In particular, the aryloxy group can be a phenoxy group from the viewpoint of acquisition of more excellent moisture resistance and ease of synthesis.

Examples of the ionic group of each of $R_7$ and $R_{12}$ include anionic groups, e.g., a carboxylic acid group, a sulfonic acid group, a phosphoric acid group, and a phosphonic acid group. The ionic group of each of $R_7$ and $R_{12}$, together with ionic groups and a sulfamoyl group that may be present in addition to the anionic group, provides the solubility into water to the compound denoted by general formula (2). The ionic group may be either an acid type or a salt type.

In the situation of the salt type ionic group, examples of counter ions constituting salts include alkali metals, e.g., lithium, sodium, and potassium; unsubstituted ammonium; and organic ammonium, e.g., methylammonium, dimethylammonium, trimethylammonium, tetramethylammonium, ethylammonium, diethylammonium, triethylammonium, tetraethylammonium, n-propylammonium, isopropylammonium, diisopropylammonium, n-butylammonium, tetra-n-butylammonium, isobutylammonium, monoethanol ammonium, diethanol ammonium, and triethanol ammonium. In this regard, not only the ionic group of each of $R_7$ and $R_{12}$ but also other ionic groups that are included in the compound denoted by general formula (2) may also be either the acid type or the salt type. Examples of counter ions in the situation of the salt type ionic group include the same counter ions as those described above.

Each of $R_7$ and $R_{12}$ can be an alkyl group having a carbon number of 1 or more to 3 or less because more excellent moisture resistance is obtained and, in particular, can be a methyl group, an ethyl group, an n-propyl group, or an isopropyl group. When each of $R_7$ and $R_{12}$ has a substituent, all groups can have the same substituent.

In general formula (2), each of $R_6$, $R_8$, $R_{11}$, and $R_{13}$ represents a hydrogen atom, an ionic group, or a group denoted by general formula (3). Examples of the ionic group of each of $R_6$, $R_8$, and $R_{13}$ include anionic groups, e.g., a carboxylic acid group, a sulfonic acid group, a phosphoric acid group, and a phosphonic acid group. The ionic group of each of $R_6$, $R_8$, $R_{11}$, and $R_{13}$, together with ionic groups and a sulfamoyl group that may be present in addition to the anionic group, provides the solubility into water to the compound denoted by general formula (2). The ionic group may be either an acid type or a salt type. Examples of counter ions constituting the salt in the situation of the salt type ionic ion include the same counter ions as those described with respect to $R_7$ and $R_{12}$.

The group denoted by general formula (3) of each of $R_6$, $R_8$, $R_{11}$, and $R_{13}$ is an acylamino group to which $R_{15}$ is bonded. $R_{15}$ may have a substituent within the bounds of not impairing the moisture resistance, the sticking recovery property, and the intermittent ejection stability of the compound denoted by general formula (2). Examples of such a substituent include alkyl groups having a carbon number of 1 or more to 3 or less, e.g., a methyl group, an ethyl group, an n-propyl group, and an isopropyl group; a hydroxy group; alkoxy groups having a carbon number of 1 or more to 3 or less, e.g., a methoxy group, an ethoxy group, and a propoxy group; and ionic groups, e.g., a carboxylic acid group, a sulfonic acid group, a phosphoric acid group, and a phosphonic acid group.

In general formula (3), $R_{15}$ represents an alkyl group, a cycloalkyl group, an aryl group, an aralkyl group, an alkenyl group, or a hetero ring group. Examples of the alkyl group include a methyl group, an ethyl group, an n-propyl group, an isopropyl group, an n-butyl group, an isobutyl group, a sec-butyl group, a tert-butyl group, a hydroxyethyl group, a methoxyethyl group, a cyanoethyl group, a trifluoromethyl group, a 3-sulfopropyl group, and a 4-sulfobutyl group. Examples of the cycloalkyl group include a cyclopentyl group, a cyclohexyl group, and a cycloheptyl group. Examples of the aryl group include a phenyl group, a p-tolyl group, a p-methoxyphenyl group, an o-chlorophenyl group, and a m-(3-sulfopropylamino)phenyl group. Examples of the aralkyl group include a benzyl group and a 2-phenethyl group. Examples of the alkenyl group include a vinyl group, a 1-propenyl group, a 2-propenyl group, a 1-methylethenyl group, a 1-butenyl group, a 2-butenyl group, and a 3-butenyl group. Examples of the hetero ring group include an imidazolyl group, a benzimidazolyl group, a pyrazolyl group, a benzopyrazolyl group, a triazolyl group, a thiazolyl group, a benzothiazolyl group, an isothiazolyl group, a benzisothiazolyl group, an oxazolyl group, a benzoxazolyl group, a thiadiazolyl group, a pyrrolyl group, a benzopyrrolyl group, an indolyl group, an isoxazolyl group, a benzisoxazolyl group, a thienyl group, a benzothienyl group, a furyl group, a benzofuryl group, a pyridyl group, a quinolyl group, an isoquinolyl group, a pyridazinyl group, a pyrimidinyl group, a pyrazinyl group, a cinnolinyl group, a phthalazinyl group, a quinazolinyl group, a guinoxalinyl group, and a triazinyl group.

In general formula (2), at least one of $R_6$, $R_8$, $R_{11}$, and $R_{13}$ can be a group denoted by general formula (3). Further, in general formula (3), $R_{15}$ can be an alkyl group having a carbon number of 2 or more to 6 or less and, in particular, an alkyl group having a carbon number of 4 or more to 6 or less. When the carbon number of the alkyl group of $R_{15}$ increases, the ozone resistance of the image is improved and, thereby, the weatherability of the image is also improved. However, if the carbon number of the alkyl group of $R_{15}$ is more than 6, the hydrophobicity of the alkyl group is enhanced and the compound of general formula (2) easily aggregates because of the hydrophobic interaction. Consequently, the compound of general formula (2) tends to be present at the position nearer to the surface of the printing medium. As a result, the locations at which the color material for the magenta ink and the color material for the cyan ink are present on the printing medium are changed in accordance with the order of application of the inks, and suppression of color unevenness of the image may become insufficient.

The carbon number of a substituent is not included in the carbon number of the alkyl group of $R_{15}$. Examples of the alkyl group of $R_{15}$ include a straight chain or branched chain alkyl group. Examples of the alkyl group of $R_{15}$ include unsubstituted alkyl groups, e.g., an n-propyl group, an isopropyl group, an n-butyl group, an isobutyl group, an n-pentyl group, an isopentyl group, a sec-pentyl group, a neopentyl group, a tert-pentyl group, an n-hexyl group, and a sec-hexyl group; and substituted alkyl groups, e.g., a 2-ethoxyhexyl group, when alkyl groups having a substituent are included. In particular, an n-pentyl group, a sec-pentyl group, and a neopentyl group can be used because more excellent moisture resistance is obtained and, in addition, the color unevenness of the image is suppressed.

The following situations can be adopted from the viewpoint of ease of synthesis of the compound denoted by general formula (2). When the compound denoted by general formula (2) has at least two groups denoted by general formula (3), the groups denoted by general formula (3) can have the same structure. Both $R_6$ and $R_{11}$ can be the groups denoted by general formula (3). In each of the combinations of $R_5$ and $R_{10}$, $R_8$ and $R_{11}$, $R_7$ and $R_{12}$, $R_8$ and $R_{13}$, and $R_9$ and $R_{14}$, the groups can be the same. Also, $R_{15}$ of general formula (3) can be an alkyl group having a carbon number of 5 or more.

In general formula (2), each Z represents a sulfonic acid group or a sulfamoyl group. When at least one of $R_6$, $R_7$, $R_8$, $R_{11}$, $R_{12}$, and $R_{13}$ has an ionic group, n represents an integer of 0 or more to 3 or less. When $R_6$, $R_7$, $R_8$, $R_{11}$, $R_{12}$, and $R_{13}$ do not have an ionic group, n represents an integer of 1 or more to 3 or less. When Z is present, Z is a substituent at the position of at least one of hydrogen atoms of aromatic rings in general formula (2). Examples of ionic groups that may be introduced in $R_6$, $R_7$, $R_8$, $R_{11}$, $R_{12}$, and $R_{13}$ include a carboxylic acid group, a sulfonic acid group, a phosphoric acid group, and a phosphonic acid group.

The sulfonic acid group of Z, together with ionic groups and a sulfamoyl group that may be present in addition to the sulfonic acid group, provides the solubility into water to the compound denoted by general formula (2). The sulfonic acid group may be either an acid type or a salt type. Examples of counter ions constituting the salt in the situation of the salt type sulfonic acid group include the same counter ions as those described with respect to the above-described ionic groups.

The sulfamoyl group of Z may have a substituent within the bounds of not impairing the moisture resistance, the sticking recovery property, and the intermittent ejection stability of the compound denoted by general formula (2). Examples of such a substituent include alkyl groups having a carbon number of 1 or more to 4 or less, e.g., a methyl group, an ethyl group, an n-propyl group, an isopropyl group, and a butyl group. Examples of the sulfamoyl group of Z include an unsubstituted sulfamoyl group (aminosulfonyl group); and substituted sulfamoyl groups, e.g., an N-methylaminosulfonyl group, an N,N'-dimethylaminosulfonyl group, and an N-n-butylaminosulfonyl group, into which an alkyl group having a carbon number of 1 or more to 4 or less has been introduced as a substituent.

In general formula (2), n represents the number of substitution with Z. When at least one of $R_6$, $R_7$, $R_8$, $R_{11}$, $R_{12}$, and $R_{13}$ has an ionic group, n represents an integer of 0 or more to 3 or less, and when $R_6$, $R_7$, $R_8$, $R_{11}$, $R_{12}$, and $R_{13}$ do not have an ionic group, n represents an integer of 1 or more to 3 or less. That is, when n=0, the compound denoted by general formula (2) does not has a sulfonic acid group nor a sulfamoyl group represented by Z. In this situation, in order to ensure the solubility of the compound that serves as a dye into the water, it is necessary that at least one of $R_6$, $R_7$, $R_8$, $R_{11}$, $R_{12}$, and $R_{13}$ have an ionic group. When at least one of $R_6$, $R_7$, $R_8$, $R_{11}$, $R_{12}$, and $R_{13}$ has an ionic group, the compound is dissolved into the water due to the ionic group and, therefore, n may be zero.

In particular, in the present disclosure, n can be 1 or more so as to ensure more excellent solubility into the water, and n can be 3 or less so as to obtain a high level of moisture resistance. In this regard, the compound denoted by general formula (2) may be a mixture of a plurality of compounds having the number of n different from each other. In the present disclosure, when the compound is a mixture, n is expressed so as to have a range. In a mixture, usually, the amount of a compound with a central value of the range is the largest. For example, the compound expressed with n=2–4 is a mixture containing compounds with n=2, 3, and 4, and the proportion of the compound with n=3 is the largest.

The compound denoted by general formula (2) can have the ionic group because the solubility into the water is more enhanced. In this situation, n in general formula (2) can be an integer of 1 or more to 3 or less and, in addition, Z can be a sulfonic acid group. At this time, in particular, the sulfonic acid group can be a salt type, and the counter ion of the sulfonic acid group can be at least one selected from the group consisting of a lithium ion, a sodium ion, a potassium ion, and an ammonium ion.

The position of substitution with Z in the main skeleton of the compound denoted by general formula (2) (that is, the structure in brackets of general formula (2)) is determined in accordance with the positions of substitution with other substituents of general formula (2) and the reaction condition of sulfonation or chlorosulfonation. When all $R_6$, $R_7$, $R_8$, $R_{11}$, $R_{12}$, and $R_{13}$ are substituents other than a hydrogen atom and the substituent of $R_{15}$ does not have an aromatic hydrogen atom, Z is a substituent at the position of a hydrogen atom of a xanthene skeleton. When at least one of $R_6$, $R_7$, $R_8$, $R_{11}$, $R_{12}$, and $R_{13}$ is a hydrogen atom, Z may be a substituent at the position of the hydrogen atom. When $R_{15}$ has an aromatic ring and an aromatic hydrogen atom, Z may be a substituent that bonds to the aromatic ring. In the present disclosure, Z can be a substituent at the position of the hydrogen atom of the xanthene skeleton from the viewpoint of ease of synthesis.

There are tautomers with respect to the compound denoted by general formula (2). It is considered that compounds denoted by general formulae (2a) and (2b) and the like in addition to the compound denoted by general formula (2) are tautomers. In the present disclosure, it is assumed that the compound denoted by general formula (2) includes these compounds (tautomers) and salts. In this regard, $R_5$ to $R_{14}$ in general formulae (2a) and (2b) are the same as $R_5$ to $R_{14}$ in general formula (2).

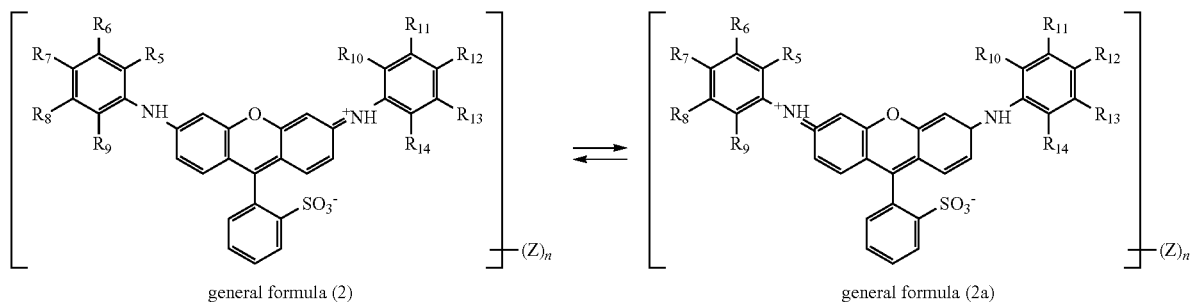

general formula (2) ⇌ general formula (2a)

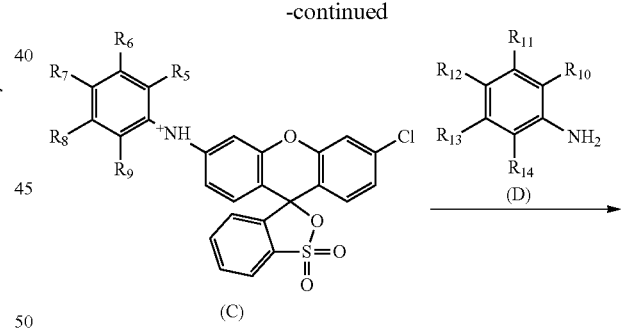

general formula (2b)

Method for Synthesizing Compound Denoted by General Formula (2)

The compound denoted by general formula (2) may be synthesized on the basis of a known method. An example of a synthesis scheme will be described below. In the synthesis scheme, $R_3$ to $R_{14}$, Z, and n in the compounds (B), (C), (D), and (E) are the same as $R_5$ to $R_{14}$, Z, and n in general formula (2). In this regard, the compound denoted by general formula (2) may be synthesized as a mixture of a plurality of isomers in which the type, the number, and the position of a substituent differ on an isomer basis. However, for the sake of convenience in the present disclosure, a "compound" also includes a situation of the mixture.

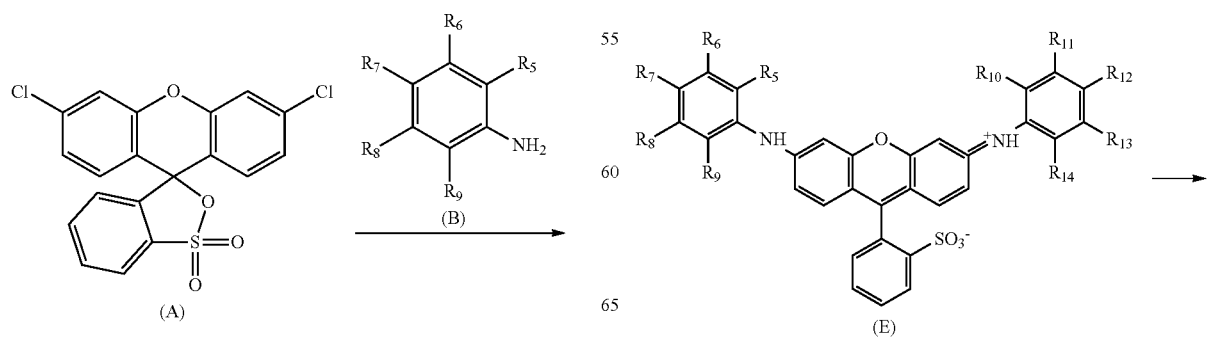

-continued

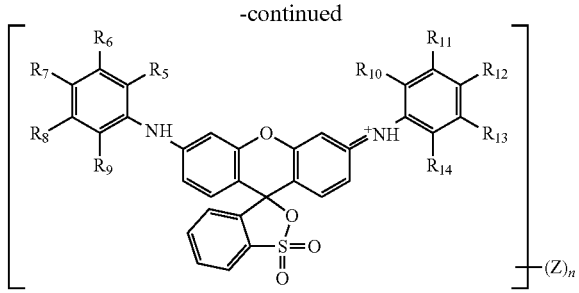

In the above-described example of the synthesis scheme, a compound denoted by general formula (2), in which n=2, is synthesized through a first condensation step shown as a first stage and a second condensation step shown as a second stage. In addition, when the solubility of the compound into the water is further enhanced, a sulfonation or sulfamoylation step may be added as a third stage. In this situation, a compound denoted by general formula (2) in which n=1 to 3 is obtained.

In the first condensation step, a compound (C) is produced by heating and condensing a compound (A) and a compound (B) in the presence of an organic solvent and a condensation agent. In the second condensation step, a compound (E) (compound denoted by general formula (2) in which n=0) is produced by heating and condensing a compound (D) and the compound (C) produced in the first condensation step. When the solubility of the compound into the water is further enhanced, the compound (E) produced in the second condensation step may be sulfonated by using a sulfonation agent, e.g., concentrated sulfuric acid and fuming sulfuric acid. Consequently, a compound (F) in which Z is a sulfonic acid group (compound denoted by general formula (2) in which n=1 to 3) is produced. In addition, a compound (F) in which Z is a sulfamoyl group (compound denoted by general formula (2) in which n=1 to 3) is produced by chlorosulfonating the compound (E) produced in the second condensation step in which chlorosulfonic acid or the like is used and, thereafter, by performing sulfamoylation on the basis of a reaction with an amine compound, e.g., concentrated ammonia water, alkylamine, or arylamine.

The organic solvent used in the condensation reaction in the above-described example of the synthesis scheme will be described. In the first condensation step, for example, methanol, ethanol, n-propanol, isopropanol, n-butanol, and the like can be used alone or in combination. In the second condensation step, for example, ethylene glycol, N-methylpyrrolidone, N,N-dimethylacetamide, N,N-dimethylformamide, dimethyl sulfoxide, sulforane, chlorobenzene, dichlorobenzene, trichlorobenzene, nitrobenzene, and the like can be used alone or in combination.

The reaction temperature in the first condensation step is preferably 60° C. to 100° C., and further preferably 70° C. or higher to 90° C. or lower. The reaction temperature in the second condensation step is preferably 120° C. to 220° C., and further preferably 180° C. or lower.

When a compound in which $R_5$ to $R_9$ and $R_{10}$ to $R_{14}$ are the same groups in general formula (2) is synthesized, the same type of compounds may be used as the compound (B) and the compound (D) in the above-described synthesis scheme. Therefore, in this situation, the compound denoted by general formula (2) is produced from the compound (A) by performing first stage condensation step. The reaction temperature at that time is preferably 120° C. to 220° C., and further preferably 180° C. or lower. For example, magnesium oxide, zinc chloride, aluminum chloride, and the like may be used as the condensation agent.

The compound, which is a final product, produced by the above-described synthesis scheme may be used in predetermined applications, e.g., a color material (dye) for ink, by being processed in the same manner as a common post-processing method of an organic synthesis reaction and, thereafter, being refined. The compound denoted by general formula (2) may be identified by utilizing $^1$H NMR analysis, LC/MS analysis, UV/Vis spectroscopic analysis, or the like.

The compound denoted by general formula (2) has excellent moisture resistance, sticking recovery property, and intermittent election stability. The compound denoted by general formula (2) may be suitable for use as a color material for various types of ink to be used for printing, painting, writing instruments, ink jet, and the like. The compound denoted by general formula (2) may also be suitable for use as a color material applied to not only various types of ink but also optical printing, a color filter, and the like.

Specific Examples of Compound Denoted by General Formula (2)

Specific examples of the compound of general formula (2) will be described below. As a matter of course, the compound denoted by general formula (2) is not limited to compounds shown in Table 1 as long as the definition of the compound denoted by general formula (2) is satisfied. In particular, the compound denoted by general formula (2) can be compound 4. In Table 1, "Me" represents a methyl group, "Et" represents an ethyl group, "PhO" represents a phenoxy group, "n-Pr" represents an n-propyl group, "i-Pr" represents an isopropyl group, and "t-Bu" represents a tertiary butyl group. In addition, "*" represents a bonding site of a substituent.

TABLE 1

Specific examples of compound denoted by general formula (2)

| Compound | $R_5$ | $R_6$ | $R_7$ | $R_8$ | $R_9$ | $R_{10}$ | $R_{11}$ | $R_{12}$ | $R_{13}$ | $R_{14}$ | Z | n |
|---|---|---|---|---|---|---|---|---|---|---|---|---|
| 1 | Me | *—NH—C(=O)—C(CH$_3$)$_2$C$_2$H$_5$ | Me | H | Me | Me | *—NH—C(=O)—C(CH$_3$)$_2$C$_2$H$_5$ | Me | H | Me | SO$_3$Na | 2 |
| 2 | Me | *—NH—C(=O)—C(CH$_3$)C$_3$H$_7$ | Me | H | Me | Me | *—NH—C(=O)—CH(CH$_3$)C$_3$H$_7$ | Me | H | Me | SO$_3$Na | 1-2 |

TABLE 1-continued

Specific examples of compound denoted by general formula (2)

| Compound | $R_5$ | $R_6$ | $R_7$ | $R_8$ | $R_9$ | $R_{10}$ | $R_{11}$ | $R_{12}$ | $R_{13}$ | $R_{14}$ | Z | n |
|---|---|---|---|---|---|---|---|---|---|---|---|---|
| 3 | Me | *—NH-C(O)-CH$_2$C(CH$_3$)$_3$ | Me | H | Me | Me | *—NH-C(O)-CH$_2$C(CH$_2$)$_3$ | Me | H | Me | SO$_3$Na | 1-3 |
| 4 | Me | *—NH-C(O)-C$_5$H$_{11}$ | Me | H | Me | Me | *—NH-C(O)-C$_5$H$_{11}$ | Me | H | Me | SO$_3$Na | 1-3 |
| 5 | Me | *—NH-C(O)-CH$_2$C(CH$_3$)$_3$ | Me | H | Me | n-Pr | *—NH-C(O)-CH$_2$C(CH$_3$)$_3$ | n-Pr | H | Me | SO$_3$Na | 2-3 |
| 6 | Me | *—NH-C(O)-CH$_2$C(CH$_3$)$_3$ | Me | H | Me | Me | *—NH-C(O)-C(CH$_3$)$_2$C$_2$H$_5$ | H | H | Me | SO$_3$Na | 1-2 |
| 7 | n-Pr | *—NH-C(O)-CH$_2$C(CH$_3$)$_3$ | H | H | n-Pr | n-Pr | *—NH-C(O)-CH$_2$C(CH$_3$)$_3$ | H | H | n-Pr | SO$_3$Na | 1-2 |
| 8 | t-Bu | *—NH-C(O)-C(CH$_3$)$_2$C$_2$H$_5$ | Me | H | Me | t-Bu | *—NH-C(O)-C(CH$_3$)$_2$C$_2$H$_5$ | Me | H | Me | SO$_3$Na | 1-2 |
| 9 | Me | *—NH-C(O)-C(CH$_3$)$_2$C$_3$H$_7$ | Me | H | Me | Me | *—NH-C(O)-C(CH$_3$)$_2$C$_3$H$_7$ | Me | H | Me | SO$_2$H | 1-2 |
| 10 | Me | *—NH-C(O)-C(CH$_3$)$_2$C$_3$H$_7$ | Me | H | Me | i-Pr | *—NH-C(O)-C(CH$_3$)$_2$C$_3$H$_7$ | i-Pr | H | i-Pr | SO$_2$NH$_2$ | 1-2 |
| 11 | Me | *—NH-C(O)-CH$_2$C(CH$_3$)$_3$ | Me | H | Me | Et | *—NH-C(O)-CH$_2$C(CH$_3$)$_3$ | Me | H | Et | SO$_3$Na | 2 |
| 12 | Me | *—NH-C(O)-C(CH$_3$)$_2$C$_2$H$_5$ | PhO | H | Me | Me | *—NH-C(O)-C(CH$_3$)$_2$C$_2$H$_5$ | Me | H | Me | SO$_3$NH$_4$ | 2 |
| 13 | Me | *—NH-C(O)-C(CH$_3$)$_2$C$_2$H$_5$ | *—OC$_3$H$_6$COONa | H | Me | Me | *—NH-C(O)-C(CH$_3$)$_2$C$_2$H$_5$ | *—OC$_3$H$_6$COONa | H | Me | SO$_3$Na | 0-2 |
| 14 | Me | *—NH-C(O)-C(CH$_3$)$_2$C$_2$H$_5$ | *—C$_3$H$_6$SO$_3$Na | H | Me | Me | *—NH-C(O)-C(CH$_3$)$_2$C$_2$H$_5$ | *—C$_3$H$_6$SO$_3$Na | H | Me | — | 0 |
| 15 | Me | *—NH-C(O)-C(CH$_3$)$_2$C$_2$H$_5$ | Me | H | Me | Me | H | Me | H | Me | SO$_3$Na | 2 |
| 16 | Me | *—NH-C(O)-C$_6$H$_{13}$ | Me | H | Me | Me | *—NH-C(O)-C(CH$_3$)$_2$C$_2$H$_5$ | *—C$_3$H$_6$SO$_3$Na | H | Me | SO$_3$Na | 1-3 |
| 17 | Me | *—NH-C(O)-C(CH$_3$)$_2$C$_2$H$_5$ | Me | H | Me | Me | *—NH-C(O)-C(CH$_3$)$_2$C$_2$H$_5$ | *—C$_3$H$_6$SO$_3$Na | H | Me | SO$_3$Na | 1-3 |

Water-Soluble Organic Solvent of Each Ink

The blue ink contains a first water-soluble organic solvent having a Log P value of −1.10 or more. The magenta ink and the cyan ink can contain a water-soluble organic solvent other than the first water-soluble organic solvent. The content (percent by mass) of the first water-soluble organic solvent in each of the magenta ink and the cyan ink can be 0.0 percent by mass or more to 5.0 percent by mass or less.

Log P (Log Pow) serving as an indicator showing the polarity of a water-soluble organic solvent will be described. Log P refers to the distribution coefficient of water and octanol (1-octanol). Log P is a physical property value related to affinity between an object substance and water, and as this value increases, the polarity is reduced. Log P is calculated by a relational expression, Log P=$\text{Log}_{10}$ $C_o/C_w$ ($C_o$ represents the concentration of the object substance in an octanol phase, and $C_w$ represents the concentration of the object substance in a water phase). Log P may be experimentally determined by a method described in JIS Z 7260-107. Also, Log P may be determined by using commercially available calculation software, e.g., trade name "ACD/Physchem Suite" (produced by ACD/Labs). In the example described later, the value determined by using the trade name "ACD/Physchem Suite Version 12.00" (produced by ACD/Labs) was adopted.

Usually, the "water-soluble organic solvent" refers to a liquid. However, in the present disclosure, the water-soluble organic solvent includes solvents that are solids at a temperature of 25° C. Specific examples of the water-soluble organic solvent include the solvents described below (the numerical value in parentheses represents the value of Log P). Examples include glycerin (−1.85), triethylene glycol (−1.65), diethylene glycol (−1.41), 1,2,6-hexane triol (−1.39), ethylene glycol (−1.36), ethyleneurea (−1.24), 2-pyrrolidone (−1.09), 1,2-propane diol (−1.01), 1,4-butane diol (−0.77), γ-butyrolactone (−0.63), δ-valerolactam (−0.57), 1,5-pentane diol (−0.56), 3-methyl-1,5-pentane diol (−0.21), δ-valerolactone (−0.10), 1,6-hexane diol (−0.05), triethylene glycol monobutyl ether (0.36), 1,2-hexane diol (0.52), ethylene glycol monobutyl ether (0.83), 1-pentanol (1.35), and 1,2-octane diol (1.54).

First Water-Soluble Organic Solvent

The Log P value of the first water-soluble organic solvent can be −1.10 or more to 1.50 or less. If the Log P value is more than 1.50, the hydrophilicity of the water-soluble organic solvent itself is reduced and, thereby, the ink easily sticks to the vicinity of an ejection port and the sticking recovery property of the ink may become insufficient. Specific examples of the first water-soluble organic solvent include the solvents described below (the numerical value in parentheses represents the value of Log P). Examples include 2-pyrrolidone (−1.09), 1,2-propane diol (−1.01), 1,4-butane diol (−0.77), γ-butyrolactone (−0.63), δ-valerolactam (−0.57), 1,5-pentane diol (−0.56), 3-methyl-1,5-pentane diol (−0.21), δ-valerolactone (−0.10), 1,6-hexane diol (−0.05), triethylene glycol monobutyl ether (0.36), 1,2-hexane diol (0.52), ethylene glycol monobutyl ether (0.83), 1-pentanol (1.35), and 1,2-octane diol (1.54). When the ink contains the first water-soluble organic solvent having a Log P value of −1.10 or more, water-soluble organic solvents having a Log P value of less than −1.10 (other water-soluble organic solvents) may be further used in combination. The content (percent by mass) of the first water-soluble organic solvent is preferably 0.4 times or more to 6.6 times or less the content (percent by mass) of the other water-soluble organic solvents on a mass ratio basis and further preferably 0.4 times or more to 3.5 times or less.

In particular, the first water-soluble organic solvent can contain a dihydric alcohol having a carbon number of the main chain of 4 or more to 7 or less. The main chain refers to the longest carbon chain in a compound, and the number of atoms other than atoms constituting hydroxy groups is counted. In this regard, the carbon chain may be a straight chain or a branched chain. For example, the carbon number of the main chain of 1,5-pentane diol is 5. When the carbon number of the main chain is 4 or more, the hydrophobicity of the dihydric alcohol is strong, a hydrophobic interaction with a hydrophobic portion of the xanthene skeleton and the like of the compound of general formula (1) occurs, and the dihydric alcohol tends to be present in the vicinity of the compound of general formula (1). Further, a OH group included in the dihydric alcohol is polarized in the ink so as to become an oxygen atom having δ$^-$ and a hydrogen atom having δ$^+$ and, thereby, the compound of general formula (1) does not easily aggregate because a $SO_3^-$ group included in general formula (1) and an oxygen atom having δ$^-$ are negative electric charges and repel each other. Consequently, the compound of general formula (1) tends to be present at a location far from the surface of the printing medium and, thereby, color unevenness of the image does not easily occur. However, if the carbon number of the main chain is more than 7, the water solubility of the water-soluble organic solvent is reduced, the ink easily sticks to the vicinity of the ejection port and, as a result, it may be difficult to provide the sticking recovery property to the ink.

Examples of the dihydric alcohol having a carbon number of the main chain of 4 or more to 7 or less include 1,4-butane diol, 1,2-butane diol, 1,5-pentane diol, 3-methyl-1,5-pentane diol, 1,2-pentane diol, 1,6-hexane diol, 1,2-hexane diol, 1,7-heptane diol, and 1,2-heptane diol. In particular, the dihydric alcohol having a carbon number of the main chain of 4 or more to 7 or less can be at least one selected from the group consisting of 1,4-butane diol, 1,5-pentane diol, 3-methyl-1,5-pentane diol, and 1,2-heptane diol.

The content (percent by mass) of the first water-soluble organic solvent in the blue ink can be 1.0 percent by mass or more to 40.0 percent by mass or less with reference to the total mass of the ink. The content (percent by mass) of the first water-soluble organic solvent in the blue ink is 1.0 times or more to 16.5 times or less the content (percent by mass) of the compound denoted by general formula (1) in the magenta ink an a mass ratio basis, and preferably 5.0 times or more to 16.5 times or less.

Aqueous Medium of Each Ink

Each of the magenta ink, the cyan ink, and the blue ink contains an aqueous medium that is a mixture solvent of water and an water-soluble organic solvent. Deionized water (ion-exchanged water) can be used as the water. The water-soluble organic solvent in each of the magenta ink and the cyan ink can contain a solvent other than the first water-soluble organic solvent. There is no particular limitation regarding the water-soluble organic solvent in the blue ink as long as the first water-soluble organic solvent is included. The ink may contain at least one of the water-soluble organic solvents.

The content (percent by mass) of the water in the ink can be 45.0 percent by mass or more to 95.0 percent by mass or less with reference to the total mass of the ink. The content (percent by mass) of the water-soluble organic solvent in the ink can be 3.0 percent by mass or more to 55.0 percent by mass or less with reference to the total mass of the ink. This content is a value including the first water-soluble organic solvent. If the content of the water-soluble organic solvent is less than 3.0 percent by mass, when the ink is used for an inkjet printing apparatus, reliability, e.g., ejection stability, may become insufficient. If the content of the water-soluble organic solvent is more than 55.0 percent by mass, the viscosity of the ink increases, and failure may occur in supply of the ink.

Other Components of each Ink

The ink may include various additives, e.g., surfactant, a pH adjuster, a debubbling agent, a rust inhibitor, a preservative, a fungicide, an antioxidant, a reducing inhibitor, and a chelating agent, as necessary.

Physical Properties of Each Ink

The blue ink refers to the ink that has a hue angle)(H°) within the range of 200° or more to 345° or less, further within the range of 250° or more to 320° or less, and in particular within the range of 260° or more to 310° or less. When the hue angle is in this range, the hue angle of the blue ink is between the hue angle of the cyan ink and the hue angle of the magenta ink. The hue angle may be measured by a common spectrophotometer, and the measurement target may be an aqueous solution in which the ink is diluted by a factor of 2,000 (on a mass basis).

The color material in the blue ink may be a single material or a combination of a plurality of color materials as long as the color expressed on the printing medium by using the blue ink has a hue angle within a color reproduction region that is expressed on the printing medium by combining the cyan ink and the magenta ink. In particular, the color material in the blue ink can be the same as the color material in the cyan ink (may be referred to as a "cyan color material") and the color material in the magenta ink (may be referred to as a "magenta color material"). In this situation, the content of the cyan color material in the blue ink can be made smaller than the content of the color material in the cyan ink and the content of the magenta color material in the blue ink can be made smaller than the content of the color material in the magenta ink from the viewpoint of suppressing color unevenness of the image. The ratio (time) of the content (percent by mass) of the magenta color material in the blue ink to the content (percent by mass) of the cyan color material in the blue ink is preferably 0.5 times or more to 1.5 times or less. The content (percent by mass) of a black color material in the blue ink is preferably 2.0 percent by mass or less, and further preferably 0.0 percent by mass.

In the present disclosure, the pH, the static surface tension, and the viscosity of the ink at 25° C. can be within the range described below. The pH is preferably 5.0 or more to 9.0 or less, and further preferably 6.0 or more to 8.5 or less. The static surface tension is preferably 30 mN/m or more to 45 mN/m or less, and further preferably 30 mN/m of more to 40 mN/m or less. The value of the surface tension may be adjusted by the type and the amount of the surfactant. The viscosity is preferably 1.0 mPa·s or more to 5.0 mPa·s or less, and further preferably 1.0 mPa·s or more to 3.0 mPa·s or less.

Among the cyan ink, the magenta ink, and the blue ink, the difference in the surface tension between the having the highest surface tension and the ink having the lowest surface tension is preferably 4 mN/m or less. If the difference in the surface tension is more than 4 mN/m, permeation positions of the cyan ink, the magenta ink, and the blue ink into the printing medium may become different from each other and, thereby, suppression of color unevenness of the image may become insufficient. The difference in the surface tension is further preferably 2 mN/m or less.

EXAMPLES

The present disclosure will be described below in further detail with reference to the examples and the comparative examples but the present disclosure is not limited to the examples described below within the bounds of not departing from the gist of the present disclosure. In this regard, the amount of the component expressed in "part" or "%" is on a mass basis, unless otherwise specified.

Preparation of Color Material

The following compounds were prepared. The structural formulae are expressed as free acid types. However, compounds (4) to (7) and (9) were used as sodium salts and compound (8) was used as a lithium salt.

Compound 1: compound denoted by formula (4), which was synthesized in conformity with the synthesis method described in Japanese Patent Laid-Open No. 2004-323605

Compound 2: compound denoted by formula (5), which was synthesized in conformity with the synthesis method described in Japanese Patent Laid-Open No. 2013-256548

Compound 3: C.I. Direct blue 199

Compound 4: C.I. Acid red 52

Compound 5: C.I. Acid red 289

Compound 6: compound denoted by formula (6), which was synthesized in conformity with the synthesis method described in Japanese Patent Laid-Open No. 2011-148973

Compound 7: compound denoted by formula (7), which was synthesized in conformity with the synthesis method described in Japanese Patent Laid-Open No. 2016-108545

Comparative compound 1: C.I. Acid blue 9

Comparative compound 2: compound denoted by formula (8), which was synthesized in conformity with the synthesis method described in Japanese Patent Laid-Open No. 2006-143989

Comparative compound 3: compound denoted by formula (9), which was synthesized in conformity with the synthesis method described in international Publication No. 2008/066062

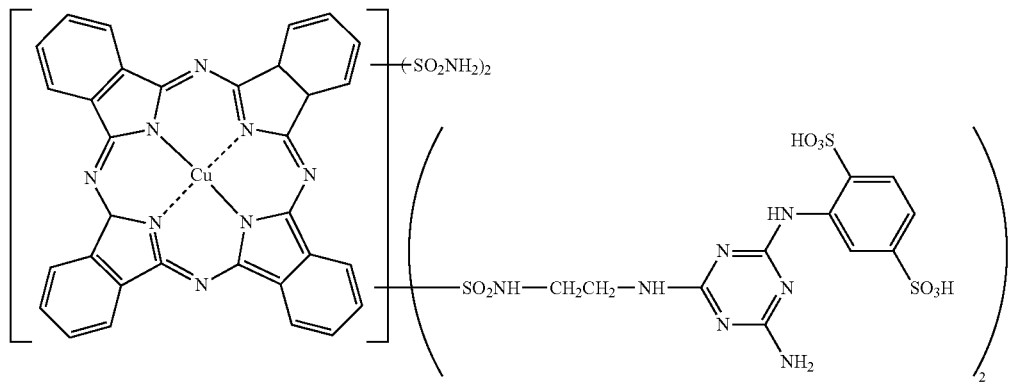

formula (4)

formula (5)
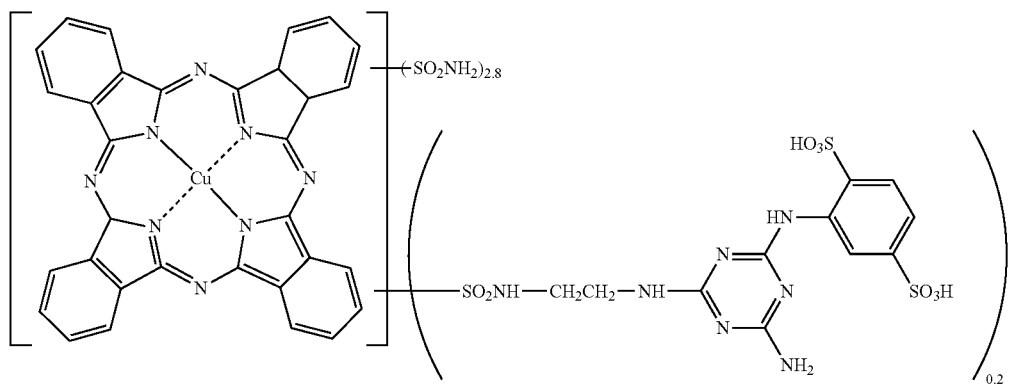
formula (6)
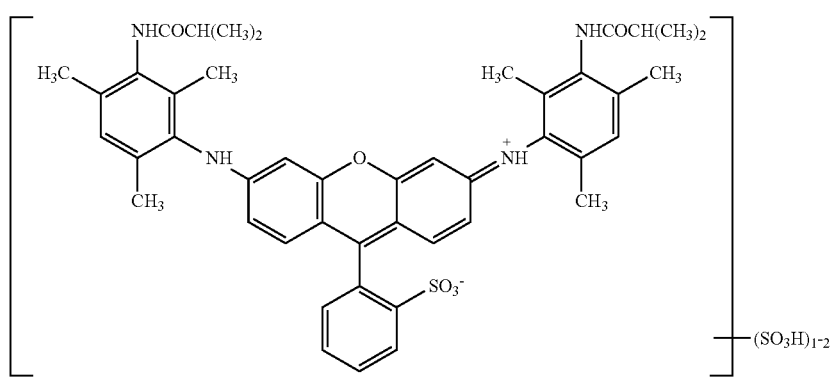
formula (7)
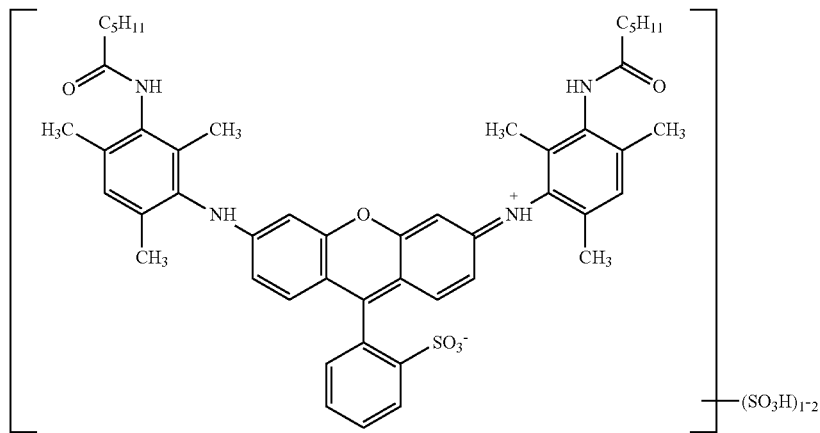

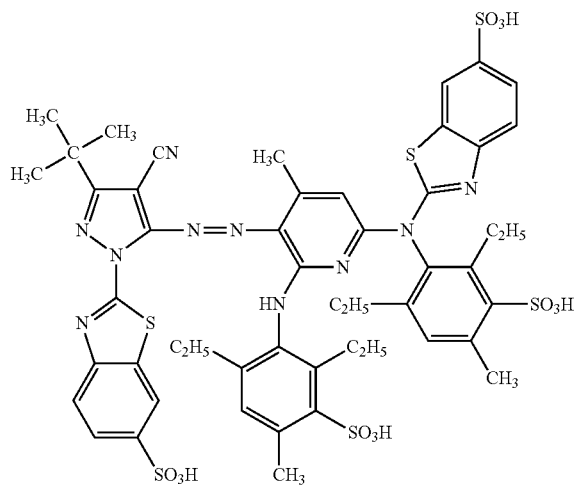

formula (8)

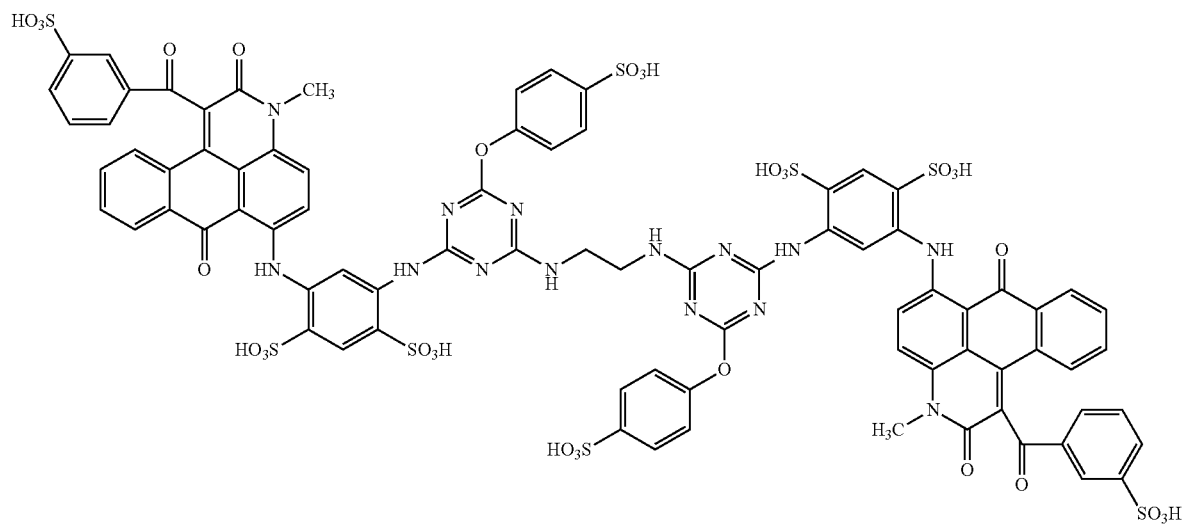

formula (9)

Preparation of Ink

The cyan ink, the magenta ink, and the blue ink were prepared by mixing components shown in Tables 2 to 5. An appropriate amount of Acetylenol E100 was added so as to provide surface tensions described in Tables 2 to 5, and ion-exchanged water was added such that the total amount became 100.0%. Agitation was sufficiently performed and, thereafter, pressure filtration was performed by using a microfilter (produced by FUJIFILM Corporation) having a pore size of 0.2 μm so as to prepare each ink. Acetylenol E100 is a nonionic surfactant produced by Kawaken Fine Chemicals Co., Ltd. In the tables, numerical values in parentheses indicate Log P values. The surface tension (mN/m) of each ink is shown in the lower sections of Tables 2 to 5. In the tables, the value (%) of the ion-exchanged water is a value including Acetylenol E100.

TABLE 2

| Composition and characteristics of cyan ink | | | | | | | | |
|---|---|---|---|---|---|---|---|---|
| | Cyan ink No. | | | | | | | |
| | 1 | 2 | 3 | 4 | 5 | 6 | 7 | 8 |
| Compound 1 | 2.5 | | | 1.3 | 2.5 | 2.5 | | 2.5 |
| Compound 2 | | 2.5 | | 1.3 | | | | |
| Compound 3 | | | 2.5 | | | | | |
| Comparative compound 1 | | | | | | | 2.5 | |
| Ethylene glycol | 9.0 | 9.0 | 9.0 | 9.0 | 9.0 | 9.0 | 9.0 | 9.0 |
| Diethylene glycol | 9.0 | 9.0 | 9.0 | 9.0 | 9.0 | 9.0 | 9.0 | 9.0 |
| Ion-exchanged water | 79.5 | 79.5 | 79.5 | 79.5 | 79.5 | 79.5 | 79.5 | 79.5 |
| Surface tension (mN/m) | 36.0 | 35.9 | 35.8 | 36.2 | 34.5 | 38.3 | 36.5 | 33.9 |

TABLE 3

Composition and characteristics of magenta ink

| | Magenta ink No. | | | | | | | | | | |
|---|---|---|---|---|---|---|---|---|---|---|---|
| | 1 | 2 | 3 | 4 | 5 | 6 | 7 | 8 | 9 | 10 | 11 |
| Compound 4 | | 2.0 | | | | | | | | | |
| Compound 5 | | | 2.0 | | | | | | | | |
| Compound 6 | | | | 2.0 | | | | | | | |
| Compound 7 | 2.0 | | | | 1.7 | 1.7 | 2.0 | 2.0 | | | 2.0 |
| Comparative compound 2 | | | | | 0.3 | | | | 2.0 | | |
| Comparative compound 3 | | | | | | 0.3 | | | | 2.0 | |
| Ethylene glycol | 9.0 | 9.0 | 9.0 | 9.0 | 9.0 | 9.0 | 9.0 | 9.0 | 9.0 | 9.0 | 9.0 |
| Diethylene glycol | 9.0 | 9.0 | 9.0 | 9.0 | 9.0 | 9.0 | 9.0 | 9.0 | 9.0 | 9.0 | 9.0 |
| Ion-exchanged water | 80.0 | 80.0 | 80.0 | 80.0 | 80.0 | 80.0 | 80.0 | 80.0 | 80.0 | 80.0 | 80.0 |
| Surface tension (mN/m) | 36.4 | 35.8 | 36.6 | 36.2 | 36.1 | 36.3 | 34.5 | 38.2 | 35.9 | 36.8 | 33.8 |

TABLE 4

Composition and characteristics of blue ink

| | Blue ink No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compound 7 | 1.0 | 1.0 | 1.0 | 1.0 | 1.0 | 1.0 | 1.0 | 1.0 | 1.0 | 1.0 | 1.0 | 1.0 |
| Compound 4 | | | | | | | | | | | | |
| Compound 2 | 1.0 | 1.0 | 1.0 | 1.0 | 1.0 | 1.0 | 1.0 | 1.0 | 1.0 | 1.0 | 1.0 | 1.0 |
| Compound 3 | | | | | | | | | | | | |
| 1,2-octane diol (1.54) | | | | | | | | | | 12.0 | | |
| 1,2-heptane diol (1.03) | | | | | | | | | 12.0 | | | |
| triethylene glycol monobutyl ether (0.36) | | | | | | | | 12.0 | | | | 6.0 |
| 3-methyl-1,5-pentane diol (−0.21) | | | | | | | 12.0 | | | | | |
| 1,5-pentane diol (−0.56) | 12.0 | | | | | | | | | 6.0 | 6.0 | 6.0 |
| γ-butyrolactone (−0.63) | | | | | | 12.0 | | | | | | |
| 1,4-butane diol (−0.77) | | | | 12.0 | | | | | | | 6.0 | |
| 1,3-propane diol (−1.09) | | | 12.0 | | | | | | | | | |
| 2-pyrrolidone (−1.09) | | 12.0 | | | | | | | | 6.0 | | |
| Ethylene glycol (−1.36) | | | | | | | | | | | | |
| Glycerin (−1.85) | 5.0 | 5.0 | 5.0 | 5.0 | 5.0 | 5.0 | 5.0 | 5.0 | 5.0 | 5.0 | 5.0 | 5.0 |
| Ion-exchanged water | 81.0 | 81.0 | 81.0 | 81.0 | 81.0 | 81.0 | 81.0 | 81.0 | 81.0 | 81.0 | 81.0 | 81.0 |
| Surface tension (mN/m) | 36.3 | 36.7 | 36.3 | 36.5 | 37.1 | 35.9 | 36.1 | 36.2 | 35.8 | 36.0 | 35.6 | 35.9 |

TABLE 5

Composition and characteristics of blue ink

| | Blue ink No. | | | | | | | | | | |
|---|---|---|---|---|---|---|---|---|---|---|---|
| | 13 | 14 | 15 | 16 | 17 | 18 | 19 | 20 | 21 | 22 | 23 |
| Compound 7 | 1.0 | 1.0 | | 1.0 | 1.0 | 1.0 | 1.0 | 1.0 | 1.0 | 1.0 | |
| Compound 4 | | | 1.0 | | | | | | | | |
| Compound 2 | 1.0 | 1.0 | | 1.0 | 1.0 | 1.0 | 1.0 | 1.0 | 1.0 | | 1.0 |
| Compound 3 | | | 1.0 | | | | | | | | |
| 1,2-octane diol (1.54) | | | | | | | | | | | |
| 1,2-heptane diol (1.03) | | | | | | | | | | | |
| triethylene glycol monobutyl ether (0.36) | | | | | | | | | | | |
| 3-methyl-1,5-pentane diol (−0.21) | | | | | | | | | | | |
| 1,5-pentane diol (−0.56) | 2.0 | 20.0 | 12.0 | 12.0 | 12.0 | 1.5 | 21.0 | 12.0 | | 12.0 | 12.0 |
| γ-butyrolactone (−0.63) | | | | | | | | | | | |
| 1,4-butane diol (−0.77) | | | | | | | | | | | |
| 1,3-propane diol (−1.09) | | | | | | | | | | | |
| 2-pyrrolidone (−1.09) | | 13.0 | | | | | 13.0 | | | | |
| Ethylene glycol (−1.36) | | | | | | | | | 12.0 | | |
| Glycerin (−1.85) | 5.0 | 5.0 | 5.0 | 5.0 | 5.0 | 5.0 | 5.0 | 5.0 | 5.0 | 5.0 | 5.0 |
| Ion-exchanged water | 91.0 | 60.0 | 81.0 | 81.0 | 81.0 | 91.5 | 59.0 | 81.0 | 81.0 | 82.0 | 82.0 |
| Surface tension (mN/m) | 36.1 | 36.8 | 35.7 | 34.4 | 38.3 | 36.3 | 36.5 | 34.0 | 35.7 | 35.8 | 36.0 |

Evaluation

The following evaluations were performed under the evaluation conditions described in Tables 6 to 9. The content of the first water-soluble organic solvent in the blue ink and the content of the compound denoted by general formula (1) in the magenta ink are shown in the middle sections of Tables 6 to 9. In addition, the content of the first water-soluble organic solvent relative to the content of the compound denoted by general formula (1) (referred to as "first water-soluble organic solvent/compound of general formula (1)" in the tables) is shown. Further, a difference between the maximum surface tension and the minimum surface tension (referred to as "difference in surface dimension" in the tables) is shown. Colorimetry of the image was performed by using a spectrophotometer (Spectorolino, produced by Gretag Macbeth) under the conditions of a light source of D50 and a visual field of 2°. In this regard, L*, a*, and b* refer to L*, a*, and b* in the L*a*b* display system specified by CIE (International Commission on Illumination). The evaluation results are shown in the lower sections of Tables 6 to 9.

Ozone Resistance of Cyan Ink

An ink cartridge was filled with each cyan ink produced as described above and was mounted on an inkjet printing apparatus (PIXUS iP8600; produced by CANON KABUSHIKI KAISHA) that ejected the ink from a printing head because of the action of thermal energy. In the present example, a solid image printed by providing 8 droplets of ink that was 2.5 μL per droplet into a unit region of 1/1,600 inch×1/1,600 inch was assumed to be a solid image with a "printing duty of 100%". This inkjet printing apparatus was used and a printed subject was produced by printing a solid image with a printing duty of 50% on glossy paper (CANON Photo Paper•Glossy Pro "Platinum Grade" PT-201; produced by CANON KABUSHIKI KAISHA) in an environment at a temperature of 23° C. and a relative humidity of 55%. The resulting printed subject was dried for 24 hours in an environment at a temperature of 23° C. and a relative humidity of 55%.

The optical density of a solid image portion of the printed subject was measured (and assumed to be an "optical density before test"). Thereafter, the printed subject was put into Ozone Weather Meter (OMS-H, produced by Suga. Test Instruments Co., Ltd.), and was subjected to ozone exposure for 5 hours under the conditions of a temperature in the chamber of 23° C., relative humidity of 50%, and an ozone concentration of 10 ppm. Subsequently, the optical density of the solid image portion of the printed subject was measured (and assumed to be an "optical density after test"). The residual ratio of optical density (%)=(optical density after test/optical density before test)×100 was calculated, and the ozone resistance of the cyan ink was rated on the basis of the evaluation criteria described below. In the present disclosure, A in the following evaluation criteria was assumed to be a tolerable level, and B was assumed to be an intolerable level.

A: the residual ratio of optical density (%) was 50% or more
B: the residual ratio of optical density (%) was less than 50%

Weatherability of Magenta Ink

Each of the moisture resistance and the ozone resistance of the magenta ink was rated on the basis of the evaluation criteria. The weatherability of the magenta ink was rated on the basis of the total point obtained by summing the point of the moisture resistance and the point of the ozone resistance of the magenta ink. Regarding the evaluation criteria, the total point of 5 points, 4 points, and 3 points were assumed to be tolerable levels, and the total point of 2 points and 1 point were assumed to be intolerable levels.

a. Moisture Resistance

An ink cartridge was filled with each magenta ink produced as described above, and a printed subject was produced by printing a solid image with a printing duty of 50% under the same conditions as those for the printing apparatus and the printing medium used for evaluating the ozone resistance of the cyan ink. The resulting printed subject was dried for 24 hours in an environment at a temperature of 23° C. and a relative humidity of 55%. Then, L*, a*, and b* of the solid image portion of the printed subject were measured (and assumed to be $L_1^*$, $a_1^*$, and $b_1^*$). The printed subject was held in a constant temperature and humidity chamber at a temperature of 30° C. and relative humidity of 90% for 168 hours. Subsequently, L*, a*, and b* of the solid image portion of the printed subject were measured (and assumed to be $L_2^*$, $a_2^*$, and $b_2^*$). The color change $(\Delta E)=\{(L_1^*-L_2^*)(a_1^*-a_2^*)^2+(b_1^*-b_2^*)^2\}^{1/2}$ was calculated, and in the present disclosure, the moisture resistance of the magenta ink was rated on the basis of the following evaluation criteria.

3 points: ΔE was less than 1.3
2 points: ΔE was 1.3 or more to less than 2.0
1 point: ΔE was 2.0 or more to less than 4.0
0 points: ΔE was 4.0 or more b. Ozone Resistance An ink cartridge was filled with each magenta ink produced as described above, and a printed subject was produced by printing a solid image with a printing duty of 50% under the same conditions as those for the printing apparatus and the printing medium used for evaluating the ozone resistance of the cyan ink. The resulting printed subject was dried for 24 hours in an environment at a temperature of 23° C. and a relative humidity of 55%. The optical density of a solid image portion of the printed subject was measured (and assumed to be an "optical density before test"). Thereafter, the printed subject was put into Ozone Weather Meter (OMS-H, produced by Suga Test Instruments Co., Ltd.), and was subjected to ozone exposure for 5 hours under the conditions of a temperature in the chamber of 23° C., relative humidity of 50%, and an ozone concentration of 10 ppm. Subsequently, the optical density of the solid image portion of the printed subject was measured (and assumed to be an "optical density after test"). The residual ratio of optical density (%)=(optical density after test/optical density before test)×100 was calculated, and in the present disclosure, the ozone resistance of the magenta ink was rated on the basis of the evaluation criteria described below.

2 points: the residual ratio of optical density (%) was 80% or more
1 point: the residual ratio of optical density (%) was 60% or more to less than. 80%
0 points: the residual ratio of optical density (%) was less than 60%

Color Developability of Magenta Ink

An ink cartridge was filled with each magenta ink produced as described above, and a printed subject was produced by printing a solid image with a printing duty of 50% under the same conditions as those for the printing apparatus and the printing medium used for evaluating the ozone resistance of the cyan ink. The resulting printed subject was dried for 24 hours in an environment at a temperature of 23° C. and a relative humidity of 55%. Then, a* and b* of the solid image portion of the printed subject were measured. The chroma $C^*=\{(a^*)^2+(b^*)^2\}^{1/2}$ was calculated from the values of a* and b* of the solid image, and in the present disclosure, the color developability of the magenta ink was rated on the basis of the following evaluation criteria. Regarding the evaluation criteria, A was assumed to be a tolerable level, and B was assumed to be an intolerable level.

A: the chroma C* was 80 or more
B: the chroma C* was less than 80

The evaluations of the bronze resistance of the image and suppression of color unevenness of the image are evaluations when a multi-order color or secondary color image of the magenta ink, the cyan ink, and the blue ink is printed.

Therefore, an inkjet printing apparatus (PIXUS iP8600, produced by CANON KABUSHIKI KAISHA) in which the ink was ejected in the order described below was used, the ink was applied in the manner described in each of (1) to (5) so as to print each image.
(1) the blue ink was applied to a region provided with both the cyan ink and the magenta ink
(2) the magenta ink was applied to a region provided with both the cyan ink and the blue ink
(3) the cyan ink was applied to a region provided with both the magenta ink and the blue ink
(4) the cyan ink and the blue ink were applied so as to be overlaid with each other
(5) the magenta ink and the blue ink were applied so as to be overlaid with each other Bronze Resistance The inkjet printing apparatus (PIXUS iP8600; produced by CANON KABUSHIKI KAISHA) was used and 16 types of multi-order color or secondary color images were printed on glossy paper (CANON Photo Paper•Glossy Gold GL-201; produced by CANON KABUSHIKI KAISHA) in an environment at a temperature of 23° C. and a relative humidity of 55%, where the order of application was as described in Table 5, and the printing duty was changed from 10% to 160% in steps of 10%. For example, when the magenta ink and the cyan ink were used and an image with a printing duty of 10% was printed, an image with a printing duty of each ink of 10% was printed. The printing duty of the image, at which a bronze phenomenon occurred, was visually examined, the printing duty was assumed to be a printing duty at which the bronze phenomenon occurred, and the bronze resistance of the secondary color image was rated on the basis of the value of the printing duty. In general, as the printing duty increases, the amount of reflected light increases and, thereby, the bronze light is easily generated. Therefore, as the printing duty at which the bronze phenomenon occurs increases, the bronze phenomenon does not easily occur, and the bronze resistance of the image is excellent. Regarding the evaluation criteria, A was assumed to be a tolerable level, and B was assumed to be an intolerable level.

A: the printing duty at which a bronze phenomenon occurred was 140% or more
B: the printing duty at which a bronze phenomenon occurred was less than 140%

Suppression of Color Unevenness

The magenta ink and the cyan ink were applied in this order to a printing medium so as to print ten types of solid images of 5 cm×5 cm, where the printing duty was changed from 5% to 50% in steps of 5%. For example, when an image with a printing duty of 5% was printed, an image with a printing duty of each ink of 5% was printed. The resulting printed subject was dried for 24 hours in an environment at a temperature of 23° C. and a relative humidity of 55%. The measurement location in the solid image was arbitrarily changed and, thereby, a* and b* were measured at 10 locations on one type of solid image basis. The chroma $C^*=\{(a^*)^2+(b^*)^2\}^{1/2}$ was calculated from the resulting values. Regarding one type of solid image, the value of the hue angle h was calculated from the values of a* and b* of C* that was closest to 45. Ten types of solid images were printed, and the average value of the hue angles h was taken as $h_1$.

The cyan ink and the magenta ink were applied in this order to a printing medium so as to print ten types of solid images of 5 cm×5 cm, where the printing duty was changed from 5% to 50% in steps of 5%. For example, when an image with a printing duty of 5% was printed, an image with a printing duty of each ink of 5% was printed. The resulting printed subject was dried for 24 hours in an environment at a temperature of 23° C. and a relative humidity of 55%. The measurement location in the solid image was arbitrarly changed and, thereby, a* and b* were measured at 10 locations on one type of solid image basis. The chroma $C^*=\{(a^*)^2+(b^*)^2\}^{1/2}$ was calculated from the resulting values. Regarding one type of solid image, the value of the hue angle h was calculated from the values of a* and b* of C* that was closest to 45. Ten types of solid images were printed, and the average value of the hue angles h was taken as $h_2$.

Further, ten types of solid images of 5 cm×5 cm were printed, where the order of application was as described in Tables 6 to 9, and the printing duty was changed from 5% to 50% in steps of 5%. For example, when an image with a printing duty of 5% was printed, an image with a printing duty of each ink of 5% was printed. The resulting printed subject was dried for 24 hours in an environment at a temperature of 23° C. and a relative humidity of 55%. The measurement location in the solid image was arbitrarily changed and, thereby, a* and b* were measured at 10 locations on one type of solid image basis. The chroma $C^*=\{(a^*)^2-(b^*)^2\}^{1/2}$ was calculated from the resulting values. Regarding one type of solid image, the value of the hue angle $h_3$ was calculated from the values of a* and b* of C* that was closest to 45.

Subsequently, among the hue angles $h_3$ in the vicinity of C*=45 of ten types of solid images, the difference in the values between the maximum hue angle and the minimum hue angle was calculated and was taken as the "hue angle difference $\Delta h_{max45}$". Likewise, regarding one type of solid image, the value of the hue angle $h_3$ was calculated from the values of a* and b* of c* that was closest to 70. Among the hue angles $h_3$ obtained from ten types of solid images, the difference in the values between the maximum hue angle and the minimum hue angle was calculated and was taken as the "hue angle difference $\Delta h_{max70}$".

An indicator showing the ratio of reduction of the hue angle difference when the blue ink is used relative to the hue angle difference when the blue ink is not used is referred to as a ratio (%) of reduction of hue angle difference described below. In the present disclosure, color unevenness of the image was rated on the basis of the following evaluation criteria by using the ratio (%) of reduction of hue angle difference. In the present disclosure, AA and A in the following evaluation criteria were assumed to be tolerable levels, and B, C, and D were assumed to be intolerable levels. Other examples and comparative examples were rated in the same manner.

ratio (%) of reduction of hue angle difference at $C^*$ of 45=(hue angle difference $\Delta h_{max45}/|h_2-h_1|$)× 100 ratio (%) of reduction of hue angle difference at $C^*$ of 70=(hue angle difference $\Delta h_{max70}/|h_2-h_1|$)× 100

AA: ratios (%) of reduction of hue angle difference of both the solid images with C*=45 and C*=70 were less than 30%
A: ratio (%) of reduction of hue angle difference of one of the solid images with C*=45 and C*=70 was 30% or less and ratio (%) of reduction of hue angle difference of the other solid image was 30% or more to less than 65%

B: ratios (%) of reduction of hue angle difference of both the solid images with C*=45 and C*=70 were 30% or more to less than 65%

C: ratio (%) of reduction of hue angle difference of one of the solid images with C*=45 and C*=70 was 30% or more to less than 65% and ratio (%) of reduction of hue angle difference of the other solid image was 65% or more D: ratios (%) of reduction of hue angle difference of both the solid images with C*=45 and C*=70 were 65% or more

TABLE 6

Evaluation condition, ink characteristics, and evaluation result

| | | Example | | | | | | | |
|---|---|---|---|---|---|---|---|---|---|
| | | 1 | 2 | 3 | 4 | 5 | 6 | 7 | 8 |
| Evaluation condition | Cyan ink No. | 1 | 2 | 3 | 4 | 1 | 1 | 1 | 1 |
| | Magenta ink No. | 1 | 1 | 1 | 1 | 2 | 3 | 4 | 5 |
| | Blue ink No. | 1 | 1 | 1 | 1 | 1 | 1 | 1 | 1 |
| | Order of application of ink | (1) | (1) | (1) | (1) | (1) | (1) | (1) | (1) |
| Ink characteristics | Difference in surface tension (mN/m) | 0.4 | 0.5 | 0.6 | 0.2 | 0.5 | 0.6 | 0.3 | 0.3 |
| | Content of first water-soluble organic solvent in blue ink (%) | 12.0 | 12.0 | 12.0 | 12.0 | 12.0 | 12.0 | 12.0 | 12.0 |
| | Content of compound of general formula (1) in magenta ink (%) | 2.0 | 2.0 | 2.0 | 2.0 | 2.0 | 2.0 | 2.0 | 2.0 |
| | First water-soluble organic solvent/compound of general formula (1) (time) | 6.0 | 6.0 | 6.0 | 6.0 | 6.0 | 6.0 | 6.0 | 6.0 |
| Evaluation result | Ozone resistance of cyan ink | A | A | A | A | A | A | A | A |
| | Weatherability of magenta ink | 5 | 5 | 5 | 5 | 3 | 4 | 4 | 5 |
| | Moisture resistance of magenta ink | 3 | 3 | 3 | 3 | 3 | 3 | 3 | 3 |
| | Ozone resistance of magenta ink | 2 | 2 | 2 | 2 | 0 | 1 | 1 | 2 |
| | Color developability of magenta ink | A | A | A | A | A | A | A | A |
| | Bronze resistance | A | A | A | A | A | A | A | A |
| | Suppression of color unevenness | AA | AA | AA | AA | AA | AA | AA | AA |

| | | Example | | | | | | | |
|---|---|---|---|---|---|---|---|---|---|
| | | 9 | 10 | 11 | 12 | 13 | 14 | 15 | 16 |
| Evaluation condition | Cyan ink No. | 1 | 1 | 1 | 1 | 1 | 1 | 1 | 1 |
| | Magenta ink No. | 6 | 1 | 1 | 1 | 1 | 1 | 1 | 1 |
| | Blue ink No. | 1 | 2 | 3 | 4 | 5 | 6 | 7 | 8 |
| | Order of application of ink | (1) | (1) | (1) | (1) | (1) | (1) | (1) | (1) |
| Ink characteristics | Difference in surface tension (mN/m) | 0.3 | 0.7 | 0.4 | 0.5 | 1.1 | 0.5 | 0.4 | 0.4 |
| | Content of first water-soluble organic solvent in blue ink (%) | 12.0 | 12.0 | 12.0 | 12.0 | 12.0 | 12.0 | 12.0 | 12.0 |
| | Content of compound of general formula (1) in magenta ink (%) | 2.0 | 2.0 | 2.0 | 2.0 | 2.0 | 2.0 | 2.0 | 2.0 |
| | First water-soluble organic solvent/compound of general formula (1) (time) | 6.0 | 6.0 | 6.0 | 6.0 | 6.0 | 6.0 | 6.0 | 6.0 |
| Evaluation result | Ozone resistance of cyan ink | A | A | A | A | A | A | A | A |
| | Weatherability of magenta ink | 5 | 5 | 5 | 5 | 5 | 5 | 5 | 5 |
| | Moisture resistance of magenta ink | 3 | 3 | 3 | 3 | 3 | 3 | 3 | 3 |
| | Ozone resistance of magenta ink | 2 | 2 | 2 | 2 | 2 | 2 | 2 | 2 |
| | Color developability of magenta ink | A | A | A | A | A | A | A | A |
| | Bronze resistance | A | A | A | A | A | A | A | A |
| | Suppression of color unevenness | AA | A | A | AA | A | AA | A | AA |

TABLE 7

Evaluation condition, ink characteristics, and evaluation result

| | | Example | | | | | | | |
|---|---|---|---|---|---|---|---|---|---|
| | | 17 | 18 | 19 | 20 | 21 | 22 | 23 | 24 |
| Evaluation condition | Cyan ink No. | 1 | 1 | 1 | 1 | 1 | 1 | 1 | 5 |
| | Magenta ink No. | 1 | 1 | 1 | 1 | 1 | 1 | 1 | 1 |
| | Blue ink No. | 9 | 10 | 11 | 12 | 13 | 14 | 15 | 1 |
| | Order of application of ink | (1) | (1) | (1) | (1) | (1) | (1) | (1) | (1) |
| Ink characteristics | Difference in surface tension (mN/m) | 0.6 | 0.4 | 0.8 | 0.5 | 0.4 | 0.8 | 0.7 | 1.9 |
| | Content of first water-soluble organic solvent in blue ink (%) | 12.0 | 12.0 | 12.0 | 12.0 | 2.0 | 33.0 | 12.0 | 12.0 |
| | Content of compound of general formula (1) in magenta ink (%) | 2.0 | 2.0 | 2.0 | 2.0 | 2.0 | 2.0 | 2.0 | 2.0 |
| | First water-soluble organic solvent/compound of general formula (1) (time) | 6.0 | 6.0 | 6.0 | 6.0 | 1.0 | 16.5 | 6.0 | 6.0 |
| Evaluation result | Ozone resistance of cyan ink | A | A | A | A | A | A | A | A |
| | Weatherability of magenta ink | 5 | 5 | 5 | 5 | 5 | 5 | 5 | 5 |
| | Moisture resistance of magenta ink | 3 | 3 | 3 | 3 | 3 | 3 | 3 | 3 |
| | Ozone resistance of magenta ink | 2 | 2 | 2 | 2 | 2 | 2 | 2 | 2 |

TABLE 7-continued

Evaluation condition, ink characteristics, and evaluation result

|  |  | | | | | | | |
|---|---|---|---|---|---|---|---|---|
| Color developability of magenta ink | A | A | A | A | A | A | A | A |
| Bronze resistance | A | A | A | A | A | A | A | A |
| Suppression of color unevenness | A | AA | AA | AA | AA | AA | AA | AA |

| | | Example | | | | | | |
|---|---|---|---|---|---|---|---|---|
| | | 25 | 26 | 27 | 28 | 29 | 30 | 31 |
| Evaluation condition | Cyan ink No. | 6 | 6 | 5 | 1 | 5 | 1 | 1 |
| | Magenta ink No. | 7 | 1 | 8 | 8 | 1 | 7 | 2 |
| | Blue ink No. | 1 | 16 | 1 | 16 | 17 | 17 | 2 |
| | Order of application of ink | (1) | (1) | (1) | (1) | (1) | (1) | (1) |
| Ink characteristics | Difference in surface tension (mN/m) | 3.8 | 3.9 | 3.7 | 3.8 | 3.8 | 3.8 | 0.9 |
| | Content of first water-soluble organic solvent in blue ink (%) | 12.0 | 12.0 | 12.0 | 12.0 | 12.0 | 12.0 | 12.0 |
| | Content of compound of general formula (1) in magenta ink (%) | 2.0 | 2.0 | 2.0 | 2.0 | 2.0 | 2.0 | 2.0 |
| | First water-soluble organic solvent/compound of general formula (1) (time) | 6.0 | 6.0 | 6.0 | 6.0 | 6.0 | 6.0 | 6.0 |
| Evaluation result | Ozone resistance of cyan ink | A | A | A | A | A | A | A |
| | Weatherability of magenta ink | 5 | 5 | 5 | 5 | 5 | 5 | 3 |
| | Moisture resistance of magenta ink | 3 | 3 | 3 | 3 | 3 | 3 | 3 |
| | Ozone resistance of magenta ink | 2 | 2 | 2 | 2 | 2 | 2 | 0 |
| | Color developability of magenta ink | A | A | A | A | A | A | A |
| | Bronze resistance | A | A | A | A | A | A | A |
| | Suppression of color unevenness | AA | AA | AA | AA | AA | AA | A |

TABLE 8

Evaluation condition, ink characteristics, and evaluation result

| | | Comparative example | | | | | | | |
|---|---|---|---|---|---|---|---|---|---|
| | | 1 | 2 | 3 | 4 | 5 | 6 | 7 | 8 |
| Evaluation condition | Cyan ink No. | 7 | 1 | 1 | 1 | 1 | 6 | 6 | 8 |
| | Magenta ink No. | 1 | 9 | 10 | 1 | 1 | 11 | 1 | 8 |
| | Blue ink No. | 1 | 1 | 1 | 18 | 19 | 1 | 20 | 1 |
| | Order of application of ink | (1) | (1) | (1) | (1) | (1) | (1) | (1) | (1) |
| Ink characteristics | Difference in surface tension (mN/m) | 0.2 | 0.4 | 0.8 | 0.4 | 0.5 | 4.5 | 4.3 | 4.3 |
| | Content of first water-soluble organic solvent in blue ink (%) | 12.0 | 12.0 | 12.0 | 1.5 | 34.0 | 12.0 | 12.0 | 12.0 |
| | Content of compound of general formula (1) in magenta ink (%) | 2.0 | 0.0 | 0.0 | 2.0 | 2.0 | 2.0 | 2.0 | 2.0 |
| | First water-soluble organic solvent/compound of general formula (1) (time) | 6.0 | — | — | 0.8 | 17.0 | 6.0 | 6.0 | 6.0 |
| Evaluation result | Ozone resistance of cyan ink | B | A | A | A | A | A | A | A |
| | Weatherability of magenta ink | 5 | 1 | 3 | 5 | 5 | 5 | 5 | 5 |
| | Moisture resistance of magenta ink | 3 | 0 | 2 | 3 | 3 | 3 | 3 | 3 |
| | Ozone resistance of magenta ink | 2 | 1 | 1 | 2 | 2 | 2 | 2 | 2 |
| | Color developability of magenta ink | A | B | B | A | A | A | A | A |
| | Bronze resistance | A | A | A | A | B | A | A | A |
| | Suppression of color unevenness | AA | AA | AA | B | A | A | A | A |

| | | Comparative example | | | | | | |
|---|---|---|---|---|---|---|---|---|
| | | 9 | 10 | 11 | 12 | 13 | 14 | 15 |
| Evaluation condition | Cyan ink No. | 1 | 8 | 1 | 1 | 1 | 1 | 1 |
| | Magenta ink No. | 8 | 1 | 11 | 2 | 3 | 4 | 1 |
| | Blue ink No. | 20 | 17 | 17 | 21 | 21 | 21 | 21 |
| | Order of application of ink | (1) | (1) | (1) | (1) | (1) | (1) | (1) |
| Ink characteristics | Difference in surface tension (mN/m) | 4.2 | 4.4 | 4.5 | 0.3 | 0.5 | 0.7 | 0.9 |
| | Content of first water-soluble organic solvent in blue ink (%) | 12.0 | 12.0 | 12.0 | 0.0 | 0.0 | 0.0 | 0.0 |
| | Content of compound of general formula (1) in magenta ink (%) | 2.0 | 2.0 | 2.0 | 2.0 | 2.0 | 2.0 | 2.0 |
| | First water-soluble organic solvent/compound of general formula (1) (time) | 6.0 | 6.0 | 6.0 | 0.0 | 0.0 | 0.0 | 0.0 |

TABLE 8-continued

| Evaluation condition, ink characteristics, and evaluation result | | | | | | | | |
|---|---|---|---|---|---|---|---|---|
| Evaluation result | Ozone resistance of cyan ink | A | A | A | A | A | A | A |
| | Weatherability of magenta ink | 5 | 5 | 5 | 3 | 4 | 4 | 5 |
| | Moisture resistance of magenta ink | 3 | 3 | 3 | 3 | 3 | 3 | 3 |
| | Ozone resistance of magenta ink | 2 | 2 | 2 | 0 | 1 | 1 | 2 |
| | Color developability of magenta ink | A | A | A | A | A | A | A |
| | Bronze resistance | A | A | A | A | A | A | A |
| | Suppression of color unevenness | A | A | A | B | C | C | D |

TABLE 9

| Evaluation condition, ink characteristics, and evaluation result | | | | | | | |
|---|---|---|---|---|---|---|---|
| | | Reference example | | | | | |
| | | 1 | 2 | 3 | 4 | 5 | 6 |
| Evaluation condition | Cyan ink No. | 1 | 1 | 1 | 1 | 1 | 1 |
| | Magenta ink No. | 1 | 1 | 1 | 1 | 1 | 1 |
| | Blue ink No. | 22 | 23 | 1 | 1 | 1 | 1 |
| | Order of application of ink | (1) | (1) | (2) | (3) | (4) | (5) |
| Ink characteristics | Difference in surface tension (mN/m) | 0.6 | 0.4 | 0.4 | 0.4 | 0.4 | 0.4 |
| | Content of first water-soluble organic solvent in blue ink (%) | 12.0 | 12.0 | 12.0 | 12.0 | 12.0 | 12.0 |
| | Content of compound of general formula (1) in magenta ink (%) | 2.0 | 2.0 | 2.0 | 2.0 | 2.0 | 2.0 |
| | First water-soluble organic solvent/compound of general formula (1) (time) | 6.0 | 6.0 | 6.0 | 6.0 | 6.0 | 6.0 |
| Evaluation result | Ozone resistance of cyan ink | A | A | A | A | A | A |
| | Weatherability of magenta ink | 5 | 5 | 5 | 5 | 5 | 5 |
| | Moisture resistance of magenta ink | 3 | 3 | 3 | 3 | 3 | 3 |
| | Ozone resistance of magenta ink | 2 | 2 | 2 | 2 | 2 | 2 |
| | Color developability of magenta ink | A | A | A | A | A | A |
| | Bronze resistance | A | A | A | A | A | A |
| | Suppression of color unevenness | B | B | AA | AA | AA | AA |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application. No. 2016-242649 filed Dec. 14, 2016 and No. 2017-178958 filed Sep. 19, 2017, which are hereby incorporated by reference herein in their entirety.

What is claimed is:

1. An inkjet printing method for printing an image on a printing medium by ejecting each of a cyan ink, a magenta ink, and a blue ink from a printing head, comprising the step of:
applying the blue ink to a region provided with both the cyan ink and the magenta ink,
wherein a color material for the cyan ink comprises a compound having a phthalocyanine skeleton,
a color material for the magenta ink comprises a compound denoted by a general formula (1) described below,
the blue ink comprises a color material and a water-soluble organic solvent,
the water-soluble organic solvent comprises a first water-soluble organic solvent having a Log P value of −1.10 or more,
the content (percent by mass) of the first water-soluble organic solvent is 1.0 times or more to 16.5 times or less the content (percent by mass) of the compound denoted by the general formula (1) in the magenta ink on a mass ratio basis, and
the hue angle of the blue ink is between the hue angle of the cyan ink and the hue angle of the magenta ink,

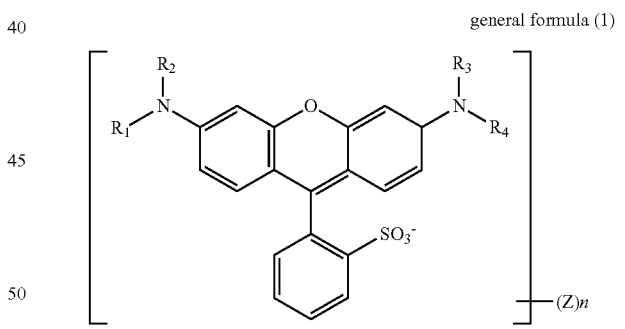

general formula (1)

(in the general formula (1), each of $R_1$, $R_2$, $R_3$, and $R_4$ represents a hydrogen atom, an alkyl group, or an aryl group, each Z represents a sulfonic acid group or a sulfamoyl group, n represents an integer of 0 or more to 3 or less, and Z is a substituent at the position of at least one of hydrogen atoms of aromatic rings in the general formula (1) when Z is present).

2. The inkjet printing method according to claim 1, wherein the color material for the magenta ink comprises a compound denoted by a general formula (2) described below, general formula (2)

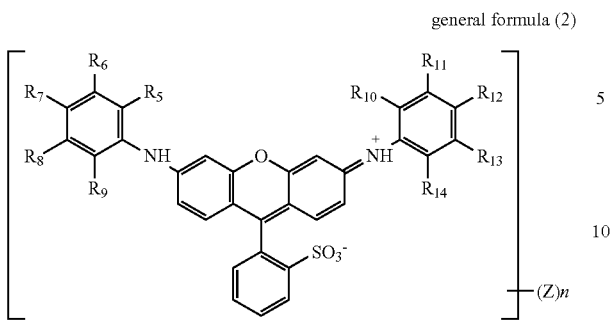

(in the general formula (2), each of $R_5$, $R_9$, $R_{10}$, and $R_{14}$ represents an alkyl group, each of $R_7$ and $R_{12}$ represents a hydrogen atom, an alkyl group, an alkoxy group, an aryloxy group, or an ionic group, each of $R_6$, $R_8$, $R_{11}$, and $R_{13}$ represents a hydrogen atom, an ionic group, or a group denoted by a general formula (3) described below, each Z represents a sulfonic acid group or a sulfamoyl group, n represents an integer of 0 or more to 3 or less when at least one of $R_6$, $R_7$, $R_8$, $R_{11}$, $R_{12}$, and $R_{13}$ has an ionic group, n represents an integer of 1 or more to 3 or less when $R_6$, $R_7$, $R_8$, $R_{11}$, $R_{12}$, and $R_{13}$ do not have an ionic group, and Z is a substituent at the position of at least one of hydrogen atoms of aromatic rings in the general formula (2) when Z is present), general formula (3)

(in the general formula (3), $R_{15}$ represents an alkyl group, a cycloalkyl group, an aryl group, an aralkyl group, an alkenyl group, or a hetero ring group).

3. The inkjet printing method according to claim 2, wherein in the general formula (2), at least one of $R_6$, $R_8$, $R_{11}$, and $R_{13}$ represents a group denoted by the general formula (3), and $R_{15}$ represents an alkyl group having a carbon number of 4 or more to 6 or less.

4. The inkjet printing method according to claim 1, wherein the first water-soluble organic solvent comprises dihydric alcohol having a carbon number of the main chain of 4 or more to 7 or less.

5. The inkjet printing method according to claim 1, wherein a difference in the surface tension between an ink having the highest surface tension and an ink having the lowest surface tension among the cyan ink, the magenta ink, and the blue ink is 4 mN/m or less.

* * * * *